US012621031B2

(12) United States Patent
Khoshnevisan et al.

(10) Patent No.: US 12,621,031 B2
(45) Date of Patent: May 5, 2026

(54) ANTENNA SWITCHING FOR REFERENCE SIGNALS

(71) Applicant: QUALCOMM Incorporated, San Diego, CA (US)

(72) Inventors: Mostafa Khoshnevisan, San Diego, CA (US); Aleksandar Damnjanovic, Del Mar, CA (US); Xiaoxia Zhang, San Diego, CA (US); Tao Luo, San Diego, CA (US); Fang Yuan, Beijing (CN); Jing Sun, San Diego, CA (US); Yitao Chen, San Marcos, CA (US); Juan Montojo, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/761,543

(22) Filed: Jul. 2, 2024

(65) Prior Publication Data

US 2024/0372594 A1      Nov. 7, 2024

Related U.S. Application Data

(63) Continuation of application No. 18/002,250, filed as application No. PCT/CN2020/110461 on Aug. 21, 2020, now Pat. No. 12,068,825.

(51) Int. Cl.
*H04B 7/06*              (2006.01)

(52) U.S. Cl.
CPC ................................... *H04B 7/0628* (2013.01)

(58) Field of Classification Search
CPC ................................................... H04B 7/0628
See application file for complete search history.

(56) References Cited

U.S. PATENT DOCUMENTS

| | | | |
|---|---|---|---|
| 2020/0358494 A1 | 11/2020 | Tang | |
| 2021/0176094 A1* | 6/2021 | Kang | ................... H04L 5/0051 |
| 2023/0246690 A1 | 8/2023 | Khoshnevisan et al. | |

FOREIGN PATENT DOCUMENTS

| | | |
|---|---|---|
| CN | 110535589 A | 12/2019 |
| CN | 110838862 A | 2/2020 |

(Continued)

OTHER PUBLICATIONS

International Preliminary Report On Patentability—PCT/CN2020/110461—The International Bureau of WIPO—Geneva, Switzerland—Mar. 2, 2023 (206969WO1).

(Continued)

*Primary Examiner* — Rahel Guarino
(74) *Attorney, Agent, or Firm* — Holland & Hart LLP

(57) ABSTRACT

Methods, systems, and devices for wireless communications are described. A user equipment (UE) may be configured to indicate to a base station a distribution of transmit antennas and receive antennas across a set of antenna panels, and the base station may configure resource sets for reference signal transmissions from the antenna panels based on the indicated distribution. In a first example, the UE may be configured to indicate a respective number of transmit antennas and receive antennas at each antenna panel. In a second example, the UE may be configured to indicate a sum of transmit antennas and a sum of receive antennas across all antenna panels, along with information on how the transmit antennas and receive antennas are distributed. Based on the indication, the base station may configure resource sets for reference signal transmission on sets of ports in resources of the resource sets.

30 Claims, 17 Drawing Sheets

Determine respective sums of transmit antennas and receive antennas over a set of antenna panels associated with the UE — 1605

Transmit, to a base station, an indication of a distribution of transmit antennas and receive antennas over the set of antenna panels, where transmitting the indication includes reporting the respective sums in the indication — 1610

Receive a configuration for a set of resource sets, the configuration mapping a set of ports associated with the set of antenna panels to the set of resource sets — 1615

Transmit, using the set of antenna panels, a set of reference signals over the set of resource sets based on the configuration and the distribution of the transmit antennas and the receive antennas over the set of antenna panels — 1620

1600

(56) References Cited

FOREIGN PATENT DOCUMENTS

| | | | |
|---|---|---|---|
| CN | 111106863 A | 5/2020 |
| WO | 2020037207 A1 | 2/2020 |

OTHER PUBLICATIONS

International Search Report and Written Opinion—PCT/CN2020/110461—ISA/EPO—May 21, 2021 (206969WO1).
Lenovo, et al., "Enhancements on Multi-Beam Operation," 3GPP TSG RAN WG1#102-e, R1-2005820, e-Meeting, Aug. 17-Aug. 28, 2020, Aug. 7, 2020 (Aug. 7, 2020), section 2.3, 6 pages.

* cited by examiner

200

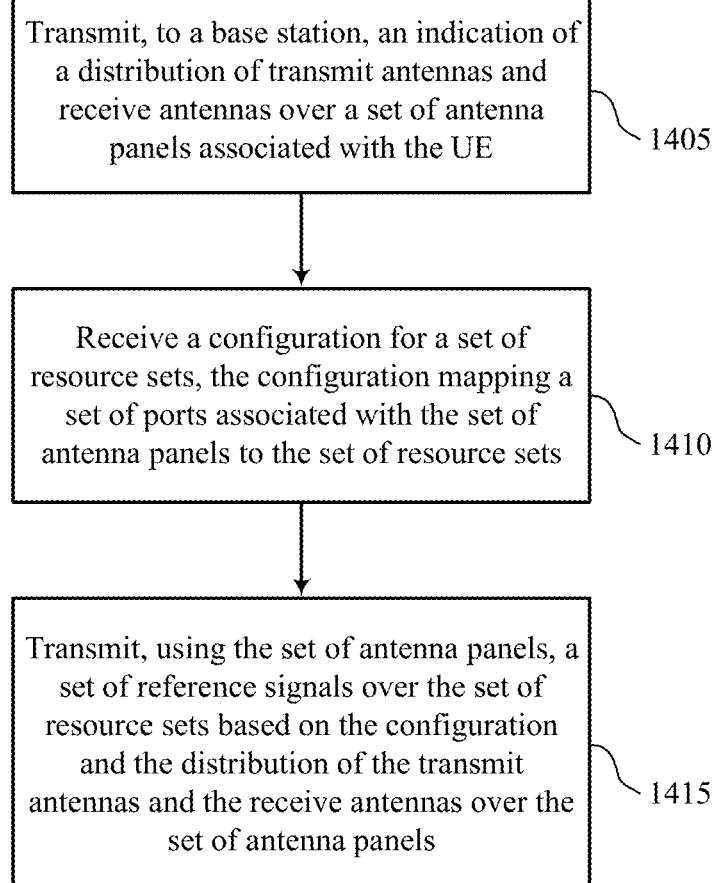

Transmit, to a base station, an indication of a distribution of transmit antennas and receive antennas over a set of antenna panels associated with the UE

1405

Receive a configuration for a set of resource sets, the configuration mapping a set of ports associated with the set of antenna panels to the set of resource sets

1410

Transmit, using the set of antenna panels, a set of reference signals over the set of resource sets based on the configuration and the distribution of the transmit antennas and the receive antennas over the set of antenna panels

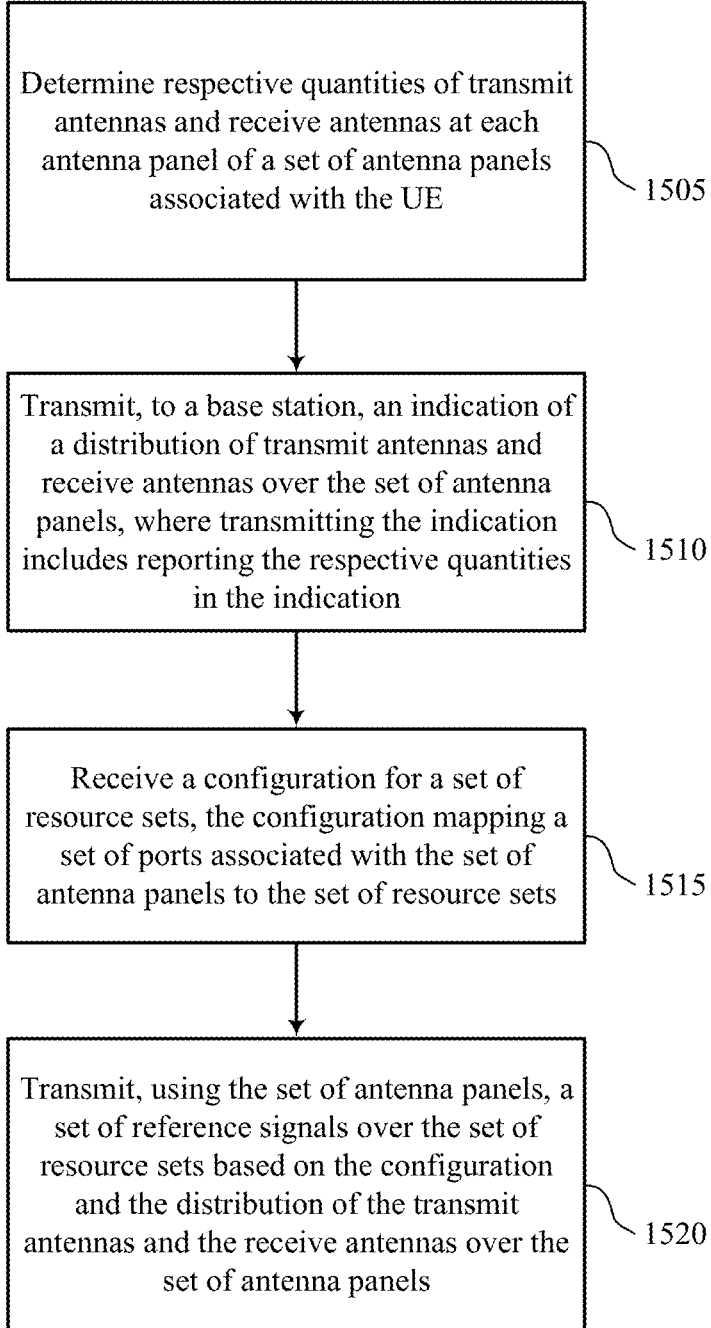

Determine respective quantities of transmit antennas and receive antennas at each antenna panel of a set of antenna panels associated with the UE

1505

Transmit, to a base station, an indication of a distribution of transmit antennas and receive antennas over the set of antenna panels, where transmitting the indication includes reporting the respective quantities in the indication

1510

Receive a configuration for a set of resource sets, the configuration mapping a set of ports associated with the set of antenna panels to the set of resource sets

1515

Transmit, using the set of antenna panels, a set of reference signals over the set of resource sets based on the configuration and the distribution of the transmit antennas and the receive antennas over the set of antenna panels

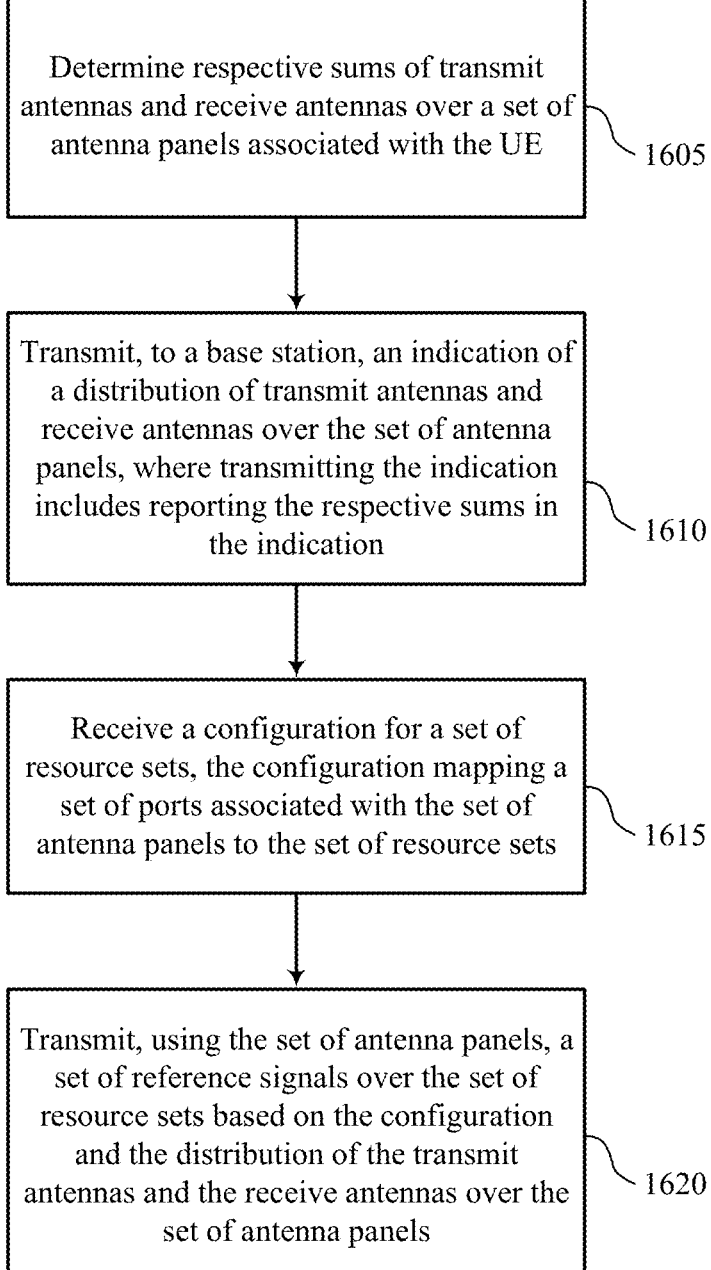

Determine respective sums of transmit antennas and receive antennas over a set of antenna panels associated with the UE

1605

Transmit, to a base station, an indication of a distribution of transmit antennas and receive antennas over the set of antenna panels, where transmitting the indication includes reporting the respective sums in the indication

1610

Receive a configuration for a set of resource sets, the configuration mapping a set of ports associated with the set of antenna panels to the set of resource sets

1615

Transmit, using the set of antenna panels, a set of reference signals over the set of resource sets based on the configuration and the distribution of the transmit antennas and the receive antennas over the set of antenna panels

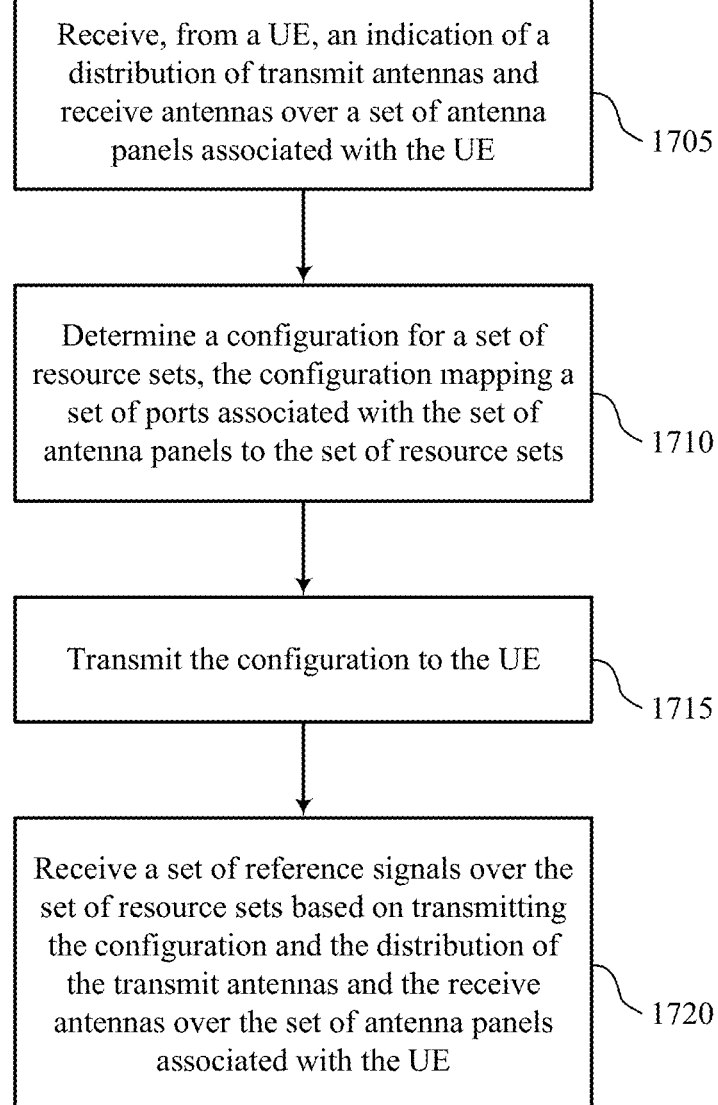

Receive, from a UE, an indication of a distribution of transmit antennas and receive antennas over a set of antenna panels associated with the UE — 1705

Determine a configuration for a set of resource sets, the configuration mapping a set of ports associated with the set of antenna panels to the set of resource sets — 1710

Transmit the configuration to the UE — 1715

Receive a set of reference signals over the set of resource sets based on transmitting the configuration and the distribution of the transmit antennas and the receive antennas over the set of antenna panels associated with the UE — 1720

ANTENNA SWITCHING FOR REFERENCE SIGNALS

CROSS REFERENCE

The present Application is a continuation of U.S. patent application Ser. No. 18/002,250 by KHOSHNEVISAN et al., entitled "ANTENNA SWITCHING FOR REFERENCE SIGNALS," filed Dec. 16, 2022, which is a 371 national phase filing of International Patent Application No. PCT/CN2020/110461 by KHOSHNEVISAN et al. entitled "ANTENNA SWITCHING FOR REFERENCE SIGNALS," filed Aug. 21, 2020, each of which is assigned to the assignee hereof, and each of which is expressly incorporated by reference in its entirety herein.

FIELD OF TECHNOLOGY

The following relates to wireless communications, including antenna switching for reference signals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support communication between base stations and UEs with various capabilities. As demand for UE efficiency increases, however, some wireless communications system may fail to efficiently manage network access for UEs with differing capabilities.

SUMMARY

The described techniques relate to improved methods, systems, devices, and apparatuses that support antenna switching for reference signals. Generally, the described techniques provide for enabling a user equipment (UE) to indicate to a base station a distribution of transmit antennas and receive antennas across a set of antenna panels, where the base station may configure resource sets for reference signal transmissions (e.g., sounding reference signal (SRS) transmissions) from the antenna panels based on the indicated distribution. In a first example, the UE may be configured to indicate a respective number of transmit antennas and receive antennas at each antenna panel, for example as a vector with an element for each antenna panel.

In a second example, the UE may be configured to indicate a total number of transmit antennas and receive antennas across all antenna panels, along with information on how the transmit antennas and receive antennas are distributed. Based on the indication, the base station may configure resource sets (e.g., SRS resource sets) for reference signal transmission on a set of ports associated with the antenna panels, which may enable the base station to configure sounding for each antenna panel to determine channel state information (CSI) for downlink transmissions to the UE.

A method of wireless communications at a UE is described. The method may include transmitting, to a base station, an indication of a distribution of transmit antennas and receive antennas over a set of antenna panels associated with the UE, receiving a configuration for a set of resource sets, the configuration mapping a set of ports associated with the set of antenna panels to the set of resource sets, and transmitting, using the set of antenna panels, a set of reference signals over the set of resource sets based on the configuration and the distribution of the transmit antennas and the receive antennas over the set of antenna panels.

An apparatus for wireless communications at a UE is described. The apparatus may include a processor, memory coupled with the processor, and instructions stored in the memory. The instructions may be executable by the processor to cause the apparatus to transmit, to a base station, an indication of a distribution of transmit antennas and receive antennas over a set of antenna panels associated with the UE, receive a configuration for a set of resource sets, the configuration mapping a set of ports associated with the set of antenna panels to the set of resource sets, and transmit, using the set of antenna panels, a set of reference signals over the set of resource sets based on the configuration and the distribution of the transmit antennas and the receive antennas over the set of antenna panels.

Another apparatus for wireless communications at a UE is described. The apparatus may include means for transmitting, to a base station, an indication of a distribution of transmit antennas and receive antennas over a set of antenna panels associated with the UE, receiving a configuration for a set of resource sets, the configuration mapping a set of ports associated with the set of antenna panels to the set of resource sets, and transmitting, using the set of antenna panels, a set of reference signals over the set of resource sets based on the configuration and the distribution of the transmit antennas and the receive antennas over the set of antenna panels.

A non-transitory computer-readable medium storing code for wireless communications at a UE is described. The code may include instructions executable by a processor to transmit, to a base station, an indication of a distribution of transmit antennas and receive antennas over a set of antenna panels associated with the UE, receive a configuration for a set of resource sets, the configuration mapping a set of ports associated with the set of antenna panels to the set of resource sets, and transmit, using the set of antenna panels, a set of reference signals over the set of resource sets based on the configuration and the distribution of the transmit antennas and the receive antennas over the set of antenna panels.

Some examples of the method, apparatuses, and non-transitory computer-readable medium described herein may further include operations, features, means, or instructions for determining respective quantities of transmit antennas and receive antennas at each antenna panel of the set of antenna panels, where transmitting to the base station the indication of the distribution of transmit antennas and receive antennas includes reporting the respective quantities in the indication.

In some examples of the method, apparatuses, and non-transitory computer-readable medium described herein, reporting the respective quantities in the indication may include operations, features, means, or instructions for reporting a vector corresponding to the set of antenna panels, where the vector includes a set of elements, each element corresponding to respective quantities of transmit antennas and receive antennas at a respective antenna panel of the set of antenna panels.

Some examples of the method, apparatuses, and non-transitory computer-readable medium described herein may further include operations, features, means, or instructions for identifying, in the configuration, one or more respective resource sets for each antenna panel of the set of antenna panels based on reporting the respective quantities in the indication.

Some examples of the method, apparatuses, and non-transitory computer-readable medium described herein may further include operations, features, means, or instructions for determining respective power control parameters and respective spatial relation parameters corresponding to each antenna panel of the set of antenna panels based on receiving the configuration, where the set of reference signals may be transmitted over the set of resource sets based on the respective power control parameters and the respective spatial relation parameters.

In some examples of the method, apparatuses, and non-transitory computer-readable medium described herein, transmitting the set of reference signals over the set of resource sets may include operations, features, means, or instructions for transmitting respective reference signals over the one or more respective resource sets using respective ports at each antenna panel of the set of antenna panels based on identifying the respective resource set.

In some examples of the method, apparatuses, and non-transitory computer-readable medium described herein, a quantity of resources in the one or more respective resource sets for an antenna panel may be based on a respective quantity of transmit antennas and receive antennas at the antenna panel.

Some examples of the method, apparatuses, and non-transitory computer-readable medium described herein may further include operations, features, means, or instructions for determining respective sums of the transmit antennas and the receive antennas over the set of antenna panels, where transmitting to the base station the indication of the distribution of transmit antennas and receive antennas includes reporting the respective sums in the indication.

Some examples of the method, apparatuses, and non-transitory computer-readable medium described herein may further include operations, features, means, or instructions for determining respective sets of power control parameters and respective sets of spatial relation parameters corresponding to each resource of the set of resource sets based on receiving the configuration, where the set of reference signals may be transmitted over the set of resource sets based on the respective sets of power control parameters and the respective sets of spatial relation parameters.

In some examples of the method, apparatuses, and non-transitory computer-readable medium described herein, transmitting the set of reference signals over the set of resource sets may include operations, features, means, or instructions for transmitting respective reference signals over each resource of the set of resource sets based on determining the respective sums of the transmit antennas and the receive antennas.

In some examples of the method, apparatuses, and non-transitory computer-readable medium described herein, the configuration maps the set of ports to the set of resource sets based on the respective sums reported in the indication.

Some examples of the method, apparatuses, and non-transitory computer-readable medium described herein may further include operations, features, means, or instructions for establishing a communication link with one or more UEs, where the set of antenna panels associated with the UE include a respective set of antenna panels associated with each UE of the one or more UEs.

In some examples of the method, apparatuses, and non-transitory computer-readable medium described herein, the set of reference signals include a set of sounding reference signals.

A method of wireless communications at a base station is described. The method may include receiving, from a UE, an indication of a distribution of transmit antennas and receive antennas over a set of antenna panels associated with the UE, determining a configuration for a set of resource sets, the configuration mapping a set of ports associated with the set of antenna panels to the set of resource sets, transmitting the configuration to the UE, and receiving a set of reference signals over the set of resource sets based on transmitting the configuration and the distribution of the transmit antennas and the receive antennas over the set of antenna panels associated with the UE.

An apparatus for wireless communications at a base station is described. The apparatus may include a processor, memory coupled with the processor, and instructions stored in the memory. The instructions may be executable by the processor to cause the apparatus to receive, from a UE, an indication of a distribution of transmit antennas and receive antennas over a set of antenna panels associated with the UE, determine a configuration for a set of resource sets, the configuration mapping a set of ports associated with the set of antenna panels to the set of resource sets, transmit the configuration to the UE, and receive a set of reference signals over the set of resource sets based on transmitting the configuration and the distribution of the transmit antennas and the receive antennas over the set of antenna panels associated with the UE.

Another apparatus for wireless communications at a base station is described. The apparatus may include means for receiving, from a UE, an indication of a distribution of transmit antennas and receive antennas over a set of antenna panels associated with the UE, determining a configuration for a set of resource sets, the configuration mapping a set of ports associated with the set of antenna panels to the set of resource sets, transmitting the configuration to the UE, and receiving a set of reference signals over the set of resource sets based on transmitting the configuration and the distribution of the transmit antennas and the receive antennas over the set of antenna panels associated with the UE.

A non-transitory computer-readable medium storing code for wireless communications at a base station is described. The code may include instructions executable by a processor to receive, from a UE, an indication of a distribution of transmit antennas and receive antennas over a set of antenna panels associated with the UE, determine a configuration for a set of resource sets, the configuration mapping a set of ports associated with the set of antenna panels to the set of resource sets, transmit the configuration to the UE, and receive a set of reference signals over the set of resource sets based on transmitting the configuration and the distribution of the transmit antennas and the receive antennas over the set of antenna panels associated with the UE.

Some examples of the method, apparatuses, and non-transitory computer-readable medium described herein may further include operations, features, means, or instructions for determining respective quantities of transmit antennas and receive antennas at each antenna panel of the set of antenna panels based on receiving the indication.

Some examples of the method, apparatuses, and non-transitory computer-readable medium described herein may further include operations, features, means, or instructions for receiving, in the indication, a vector corresponding to the set of antenna panels, where the vector includes a set of elements, each element corresponding to respective quantities of transmit antennas and receive antennas at a respective antenna panel of the set of antenna panels.

Some examples of the method, apparatuses, and non-transitory computer-readable medium described herein may further include operations, features, means, or instructions for determining one or more respective resource sets for each antenna panel of the set of antenna panels based on determining the respective quantities, where determining the configuration may be based on determining the one or more respective resource sets.

Some examples of the method, apparatuses, and non-transitory computer-readable medium described herein may further include operations, features, means, or instructions for determining respective power control parameters and respective spatial relation parameters corresponding to each antenna panel of the set of antenna panels, where the configuration transmitted to the UE includes the respective power control parameters and the respective spatial relation parameters, and where the set of reference signals may be received over the set of resource sets based on the respective power control parameters and the respective spatial relation parameters.

In some examples of the method, apparatuses, and non-transitory computer-readable medium described herein, receiving the set of reference signals over the set of resource sets may include operations, features, means, or instructions for receiving respective reference signals over the one or more respective resource sets based on transmitting the configuration to the UE.

In some examples of the method, apparatuses, and non-transitory computer-readable medium described herein, each resource of the one or more respective resource sets for an antenna panel corresponds to a respective quantity of transmit antennas and receive antennas at the antenna panel.

Some examples of the method, apparatuses, and non-transitory computer-readable medium described herein may further include operations, features, means, or instructions for determining respective sums of the transmit antennas and the receive antennas over the set of antenna panels based on receiving the indication.

Some examples of the method, apparatuses, and non-transitory computer-readable medium described herein may further include operations, features, means, or instructions for determining respective sets of power control parameters and respective sets of spatial relation parameters corresponding to each resource of the set of resource sets, where determining the configuration may be based on determining the respective sets of power control parameters and respective sets of spatial relation parameters, and where the set of reference signals may be received over the set of resource sets based on the respective sets of power control parameters and the respective sets of spatial relation parameters.

In some examples of the method, apparatuses, and non-transitory computer-readable medium described herein, receiving the set of reference signals over the set of resource sets may include operations, features, means, or instructions for receiving respective reference signals over each resource of the set of resource sets based on determining the respective sums of the transmit antennas and the receive antennas.

In some examples of the method, apparatuses, and non-transitory computer-readable medium described herein, the configuration maps the set of ports to the set of resource sets based on determining the respective sums.

Some examples of the method, apparatuses, and non-transitory computer-readable medium described herein may further include operations, features, means, or instructions for determining channel state information for one or more downlink transmissions to the UE based on receiving the set of reference signals, and transmitting the one or more downlink transmissions based on determining the channel state information.

In some examples of the method, apparatuses, and non-transitory computer-readable medium described herein, the set of reference signals include a set of sounding reference signals.

BRIEF DESCRIPTION OF THE DRAWINGS

FIGS. 14 through 17 show flowcharts illustrating methods that support antenna switching for reference signals in accordance with aspects of the present disclosure.

DETAILED DESCRIPTION

Figure 1:
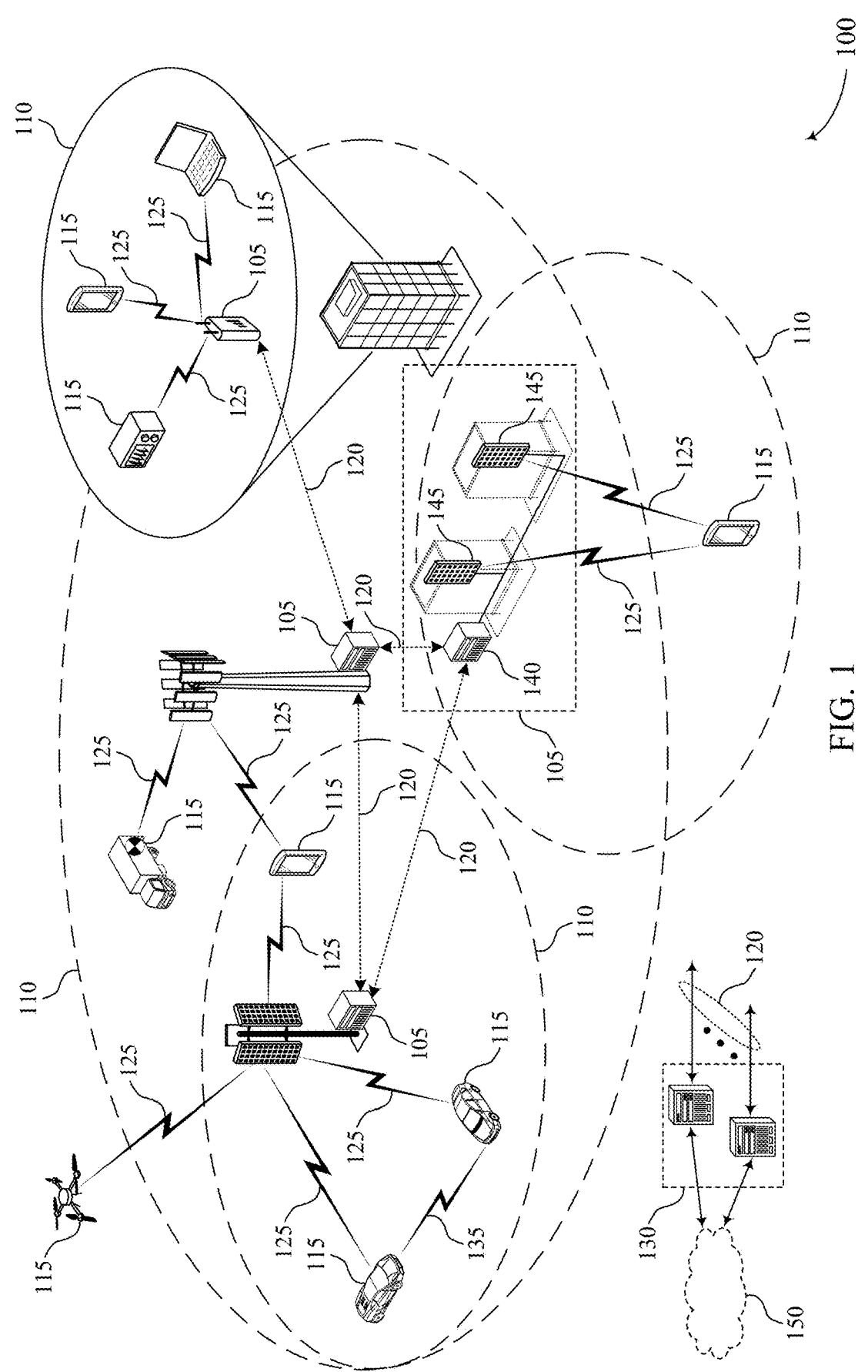
FIGS. 1 through 3 illustrate examples of wireless communications systems that support antenna switching for reference signals in accordance with aspects of the present disclosure.

Some wireless communication systems may include one or more user equipment (UEs) and one or more base stations, such as next-generation NodeBs or giga-NodeBs (either of which may be referred to as a gNB) that may support one or more multiple radio access technologies including 4G systems such as Long Term Evolution (LTE) systems, fifth generation (5G) systems which may be referred to as New Radio (NR) systems, and Wi-Fi systems (e.g., wireless local area network (WLAN) systems).

In some cases, a base station may obtain channel state information (CSI) before performing a downlink transmission to a UE by configuring the UE to transmit a sounding reference signal (SRS). The UE may indicate a number of transmit antennas and receive antennas, and the base station may configure SRS resource sets for the UE to transmit SRS. In some cases, the UE may include multiple antenna panels, where each panel may include different transmit and receive antenna capabilities. As used herein, the term "antenna panel" may refer to a set of co-located transmit antennas and receive antennas, which may be arranged in an array at a UE for communications with other wireless devices (e.g., base stations, other UEs, and the like). In some examples, the UE may be a virtual UE (which may also be referred to as a cooperative UE) created from a set of UEs operating in sidelink communications. The virtual UE may have antenna panels at each UE, distributed about the virtual UE. In some cases (e.g., beamforming), sounding antennas (via SRS) at a first panel may require a different set of power control parameters for the SRS than sounding antennas at a second panel. It may therefore be beneficial to configure different resource sets for transmitting SRS from different antenna panels at the UE.

According to the techniques described herein, a UE may be configured to indicate to a base station a distribution of transmit antennas and receive antennas across a set of antenna panels, where the base station may configure resource sets for reference signal (e.g., SRS) transmissions from the antenna panels based on the indicated distribution. In a first example, the UE may be configured to indicate a respective number of transmit antennas and receive antennas at each antenna panel, for example as a vector with an element for each antenna panel. In a second example, the UE may be configured to indicate a total number of transmit antennas and receive antennas across all antenna panels, along with information on how the transmit antennas and receive antennas are distributed. Based on the indication, the base station may configure resource sets (e.g., SRS resource sets) for reference signal transmission on sets of ports in resources of the resource sets, which may enable the base station to configure sounding for each antenna panel to determine CSI for downlink transmissions to the UE.

Aspects of the disclosure are initially described in the context of wireless communications systems. Aspects of the disclosure are further illustrated by and described with reference to resource mappings, a process flow, apparatus diagrams, system diagrams, and flowcharts that relate to antenna switching for reference signals.

FIG. 1 illustrates an example of a wireless communications system 100 that supports antenna switching for reference signals in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz. (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below: 300 MHZ.

The wireless communications system 100 may also operate in a super high frequency (SHF) region using frequency bands from 3 GHZ to 30 GHZ, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to the techniques described herein, a UE 115 may be configured to indicate to a base station 105 a distribution of transmit antennas and receive antennas across a set of antenna panels at the UE 115, and the base station 105 may configure resource sets for reference signal (e.g., SRS) transmissions from the antenna panels based on the indicated distribution. In a first example, the UE 115 may be configured to indicate a respective number of transmit antennas and receive antennas at each antenna panel, for example as a vector with an element for each antenna panel. In a second example, the UE 115 may be configured to indicate a total number of transmit antennas and receive antennas across all antenna panels, along with information on how the transmit antennas and receive antennas are distributed. Based on the indication, the base station 105 may configure resource sets (e.g., SRS resource sets) for reference signal transmission on sets of ports in resources of the resource sets, which may enable the base station 105 to configure sounding for each antenna panel to determine CSI for downlink transmissions to the UE 115.

Figure 2:
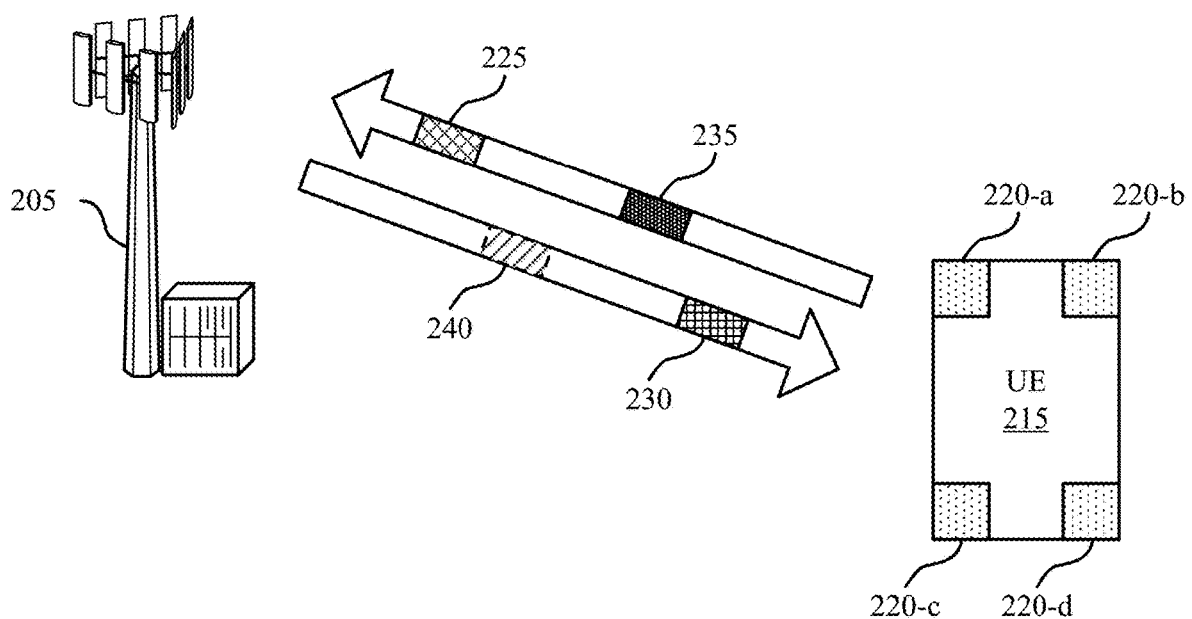
Figure 2:
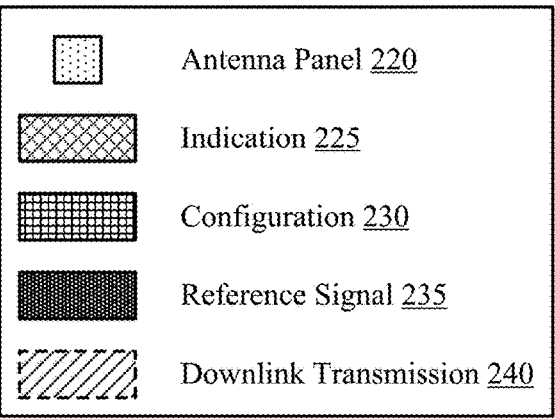

FIG. 2 illustrates an example of a wireless communications system 200 that supports antenna switching for reference signals in accordance with aspects of the present disclosure. In some examples, wireless communications system 200 may implement aspects of wireless communications system 100. For example, the wireless communications system 200 may include a base station 205 and a UE 215, which may be examples of the corresponding devices described with reference to FIG. 1. The wireless communications system 200 may include features for improved communications between the UE 215 and the base station 205, among other benefits.

The UE 215 and the base station 205 may communicate as scheduled by the base station 205. The communications may include uplink transmissions from the UE 215 to the base station 205 and downlink transmissions 240 from the base station 205 to the UE 215. In some cases, prior to transmitting a downlink transmission 240, the base station 205 may configure the UE 215 to transmit reference signals 235 (e.g., SRS) in one or more uplink transmissions to obtain CSI for a downlink channel carrying the downlink transmission 240. The base station 205 may assume a reciprocity between the downlink channel and an uplink channel carrying the reference signals 235, for example in a TDD configuration, and so may determine the CSI based on receiving the reference signals 235.

In some cases, the UE 215 may include one or more antenna panels 220, which may be located at various physical locations on the UE 215. As used herein, the term "antenna panel" may refer to a set of co-located transmit antennas and receive antennas, which may be arranged in an array at the UE 215 for communications with other wireless devices, such as the base station 205, other UEs (not shown), etc. The UE 215 may be configured to transmit an indication 225 to the base station 205 that indicates the quantity of transmit antennas and receive antennas. For example, the indication 225 may be represented as xTyR, where y may represent the quantity of antennas at the UE 215 that may be used for receiving signals (i.e., receive antennas), and x may represent the quantity of antennas (out of y antennas) that may be used at a given time for transmitting signals (i.e., transmit antennas). Based on the indication 225, the base station 205 may transmit a configuration 230 to the UE 215 that configures resources (e.g., SRS resources) for transmission of the reference signals 235. In some examples, each resource may correspond to a different symbol or a different slot.

In some examples, the quantities x and y may be equal, and the UE 215 may indicate the quantities in the indication 225. Based on receiving the indication 225, the base station 205 may configure a resource (e.g., an SRS resource) with a quantity x (where x=y) of ports for the UE 215 to transmit the reference signals 235 for channel sounding, and transmit the configuration 230 to the UE 215. Based on the configuration 230, the UE 215 may transmit, in the configured resource, a respective reference signal 235 on a respective port using each transmit antenna of the x transmit antennas at the UE 215. Based on the received reference signals 235 and the assumed channel reciprocity, the base station 205 may sound each of the y receive antennas at the UE 215 to determine CSI before transmitting the downlink transmission 240.

In some examples, the quantity of transmit antennas may be less than the quantity of receive antennas (e.g., x<y), and the UE 215 may indicate the quantities in the indication 225. Because the UE 215 has x transmit antennas (where x<y), the UE 215 may transmit reference signals 235 in a resource with up to x ports, and the base station 205 may sound x receive antennas based on a single resource. Accordingly, based on receiving the indication 225, the base station 205 may determine to configure one or more resource sets using antenna switching at the UE 215 to sound each of the y receive antennas at the UE 215 to determine CSI before transmitting the downlink transmission 240. The base station 205 may transmit the configuration identifying the resource sets to the UE 215. The resource sets may be periodic, semi-persistent, or aperiodic as configured by the base station 205. The resource sets may each include a quantity of resources, where the UE 215 may transmit reference signals 235 in each resource with up to x ports. The base station 205 may configure the quantity of resources in the resource sets such that the base station 205 may sound each of the y antennas based on receiving reference signals 235 in the resource sets.

In some cases, the base station may include a set of power control parameters in the configuration 230, which the UE 215 may use to configure transmission of the reference signals 235. For example, the base station 205 may configure a power offset Po, a ratio of path loss compensation a, an index for path loss (PL) reference signals to be measured by the UE 215, a closed loop index, or any combination thereof. The power control parameters may be configured for the resource set, rather than for each resource. In cases where the base station 205 configures multiple resource sets, the base station may configure the same set of power control parameters for each resource set identified in the configuration 230.

In some cases, when the transmit antennas and receive antennas are distributed across multiple antenna panels 220 located at various physical locations on the UE 215, a single set of power control parameters for the resource sets may reduce a reliability of the reference signals 235 for sounding the receive antennas. For example, a path loss from the base station 205 to an antenna panel 220-*a* may be different than a path loss from the base station 205 to an antenna panel 220-*b*. The difference in path loss may be magnified when the base station 205 communicates with the UE 215 using beamforming techniques. It may be beneficial to configure different sets of power control parameters and spatial relation parameters (e.g., beam-specific parameters or beamforming parameters) for different antenna panels 220 at the UE 215.

According to the techniques described herein, the UE 215 may be configured to indicate to a base station 205 a distribution of transmit antennas and receive antennas across the antenna panels 220 at the UE 215, for example in the indication 225. In some examples, the UE 215 may be configured to indicate a respective quantity of transmit antennas and receive antennas at each antenna panel 220, such as in a vector with an element for each antenna panel 220. In an illustrative example, the UE 215 may indicate respective quantities of transmit antennas and receive antennas at each of antenna panels 220-*a* through 220-*d* in the vector (1T2R, 1T4R, 2T2R, 2T4R) in the indication 225. In some examples, the UE 215 may be configured to indicate a sum of transmit antennas and receive antennas across all antenna panels 220, along with information on how the transmit antennas and receive antennas are distributed. In an illustrative example, the UE 215 may indicate the sums of transmit and receive antennas as 6T12R, along with the distribution information, in the indication 225.

Based on the indication 225, the base station 205 may configure resource sets (e.g., SRS resource sets) for transmitting the reference signals 235 on a set of ports in resources of the resource sets. In a first option, the base station 205 may configure respective resource sets corresponding to the respective reported $x_iTy_iR$ for each antenna panel 220. Within each resource set, the base station 205 may configure $y_i/x_i$ resources, where each resource may include $x_i$ ports, such that the base station 205 may sound each of the $y_i$ receive antennas of the antenna panel 220 based on receiving reference signals 235 in the resource set. In an illustrative example, the UE 215 may report 1T2R for the antenna panel 220-*a* in the indication 225. Based on the indication 225, the base station 205 may configure two resources, each with one port, to sound each of the two receive antennas at the antenna panel 220-*a*.

In some examples of the first option, the base station 205 may configure multiple resource sets for a single antenna panel 220. In an illustrative example, the UE 215 may report 1T4R for the antenna panel 220-*b* in the indication 225. Based on the indication 225, the base station 205 may configure one resource set including four resources, each with one port, or two resource sets that each include two resources, each with one port. The base station may receive reference signals 235 in resources of the one or two resource sets to sound each of the four receive antennas at the antenna panel 220-*b*.

In some examples of the first option, the base station 205 may configure respective sets of power control parameters for each antenna panel 220 of the UE 215. If the base station 205 configures multiple resource sets for an antenna panel 220 (e.g., the antenna panel 220-*b*), the base station 205 may configure the same set of power control parameters for each resource set for the antenna panel 220.

In the first option, the base station 205 may configure a total of $$\sum_{i=1}^{N} y_i/x_i$$

resources for sounding the $$\sum_{i=1}^{N} y_i$$

receive antennas at N antenna panels 220 of the UE 215. In the example illustrated in FIG. 2, N=4 for the UE 215. Each resource may include a different quantity of ports. For example, a first $y_1/x_1$ resources may include $x_1$ ports, while a second $y_2/x_2$ resources may include $x_2$ ports.

In a second option, the base station 205 may configure resources such that each resource includes a same quantity of ports, where the resources may be included within one or more resource sets. Each resource may include $$\sum_{i=1}^{N} x_i$$

ports, where N represents the quantity of antenna panels 220 at the UE 215 (e.g., N=4 in the example illustrated in FIG. 2) and $x_i$ represents the quantity of transmit antennas at an ith antenna panel 220. The base station 205 may configure a total of $$\sum_{i=1}^{N} y_i/\sum_{i=1}^{N} x_i$$

resources for sounding the $$\sum_{i=1}^{N} y_i$$

receive antennas at the N antenna panels 220 of the UE 215. For each resource, the base station 205 may configure different ports with different sets of power control parameters and spatial relation parameters. For example, a first $x_1$ ports of each resource (which may correspond to the $x_1$ transmit antennas of a first antenna panel 220 (e.g., the antenna panel 220-*a*) of the UE 215) may be configured with a first set of power control parameters and a first set of spatial relation parameters for transmitting reference signals 235 using a first set of uplink beams. A second $x_2$ ports of each resource (which may correspond to the $x_2$ transmit antennas of a second antenna panel 220 (e.g., the antenna panel 220-*b*) of the UE 215) may be configured with a second set of power control parameters and a second set of spatial relation parameters for transmitting reference signals 235 using a second set of uplink beams.

The base station 205 may transmit the configuration 230 to the UE 215, which may configure the UE 215 using the first option or the second option. The UE 215 may transmit the reference signals 235 according to the configuration 230, which may enable the base station 205 to sound the transmit antennas and receive antennas at each antenna panel 220 to determine CSI for the downlink transmission 240.

Figure 3:
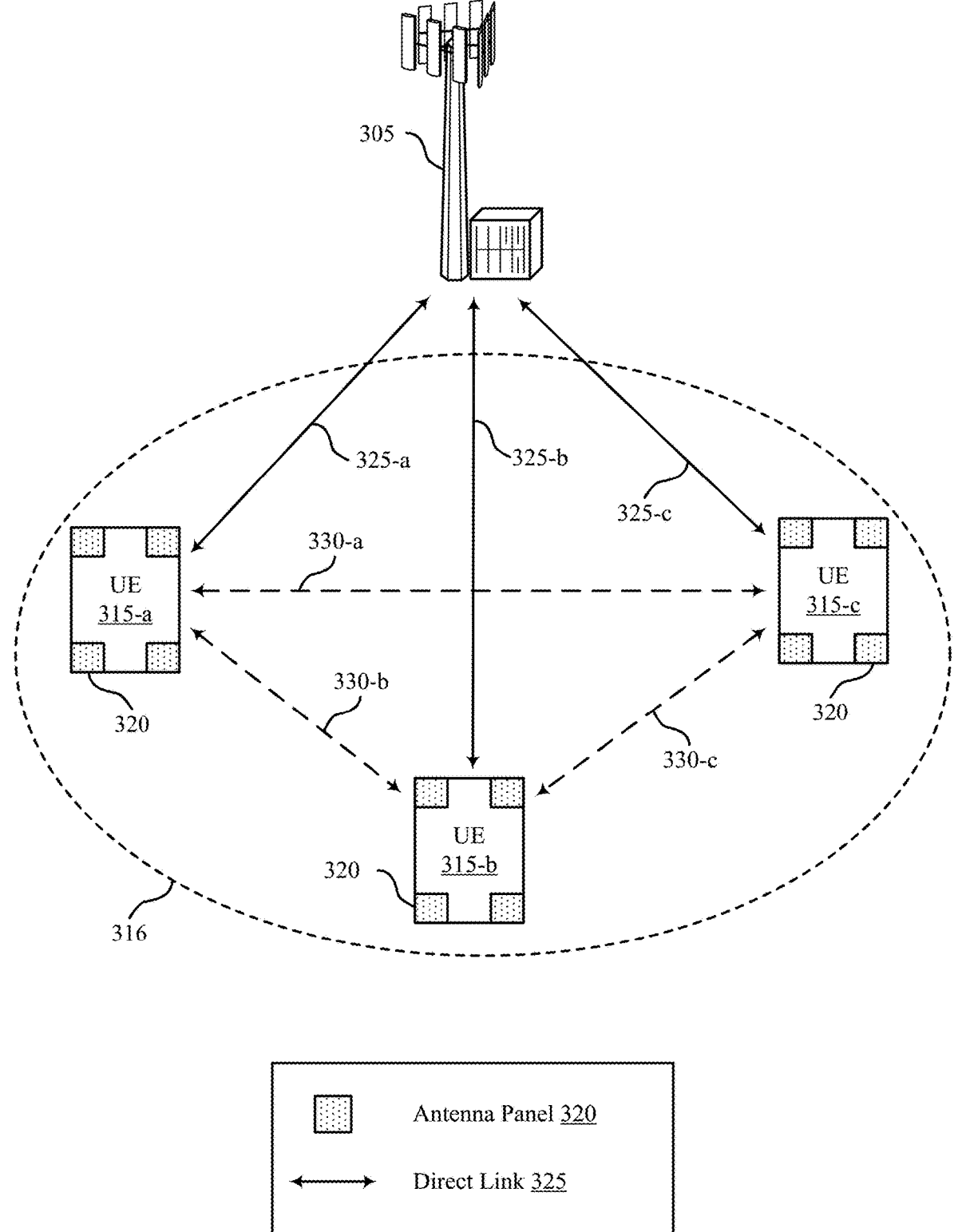

FIG. 3 illustrates an example of a wireless communications system 300 that supports antenna switching for reference signals in accordance with aspects of the present disclosure. In some examples, the wireless communications system 300 may implement aspects of wireless communications systems 100 or 200. For example, the wireless communications system 300 may include a base station 305 and a set of UEs 315, which may be examples of the corresponding devices described with reference to FIG. 1. The wireless communications system 300 may include features for improved communications between the UEs 315 and the base station 305, among other benefits.

The UEs 315 may transmit and receive communications as scheduled by the base station 305. The UEs 315 may communicate with the base station via direct links 325 (e.g., communication links 125 described with reference to FIG. 1). Additionally or alternatively, the UEs 315 may communicate directly with one another via sidelink connections 330 without transmitting through the base station 305. The sidelink connections 330 may illustrate examples of D2D communication, V2X communication, or another example of sidelink communication in the wireless communications system 300.

In some examples, the UEs 315 may establish a relay using the sidelink connections 330 to create a virtual UE 316, which in some cases may be referred to as a cooperative UE, to improve a user experience in the wireless communications system 300. For example, each UE 315 may include one or more antenna panels 320, and the virtual UE 316 may accordingly include a greater quantity of antenna panels 320 (e.g., in a virtual MIMO configuration), which may improve communications reliability and efficiency at the UEs 315.

According to the techniques described herein, the virtual UE 316 may be configured to indicate to a base station 305 a distribution of transmit antennas and receive antennas across the set of antenna panels 320 at the virtual UE 316, which may include the respective antenna panels at each UE 315 in the virtual UE 316. The base station 305 may configure resource sets for reference signal (e.g., SRS) transmissions from the antenna panels 320 based on the indicated distribution. In a first example, the virtual UE 316 may be configured to indicate a respective number of transmit antennas and receive antennas at each antenna panel 320, for example as a vector with an element for each antenna panel 320. In a second example, the virtual UE 316 may be configured to indicate a total number of transmit antennas and receive antennas across all antenna panels 320 of the virtual UE 316, along with information on how the transmit antennas and receive antennas are distributed across the antenna panels 320. Based on the indication, the base station 305 may configure resource sets (e.g., SRS resource sets) for reference signal transmission on sets of ports in resources of the resource sets, which may enable the base station 305 to configure sounding for each antenna panel 320 of the virtual UE 316 to determine CSI for downlink transmissions to the virtual UE 316.

Figure 4A:
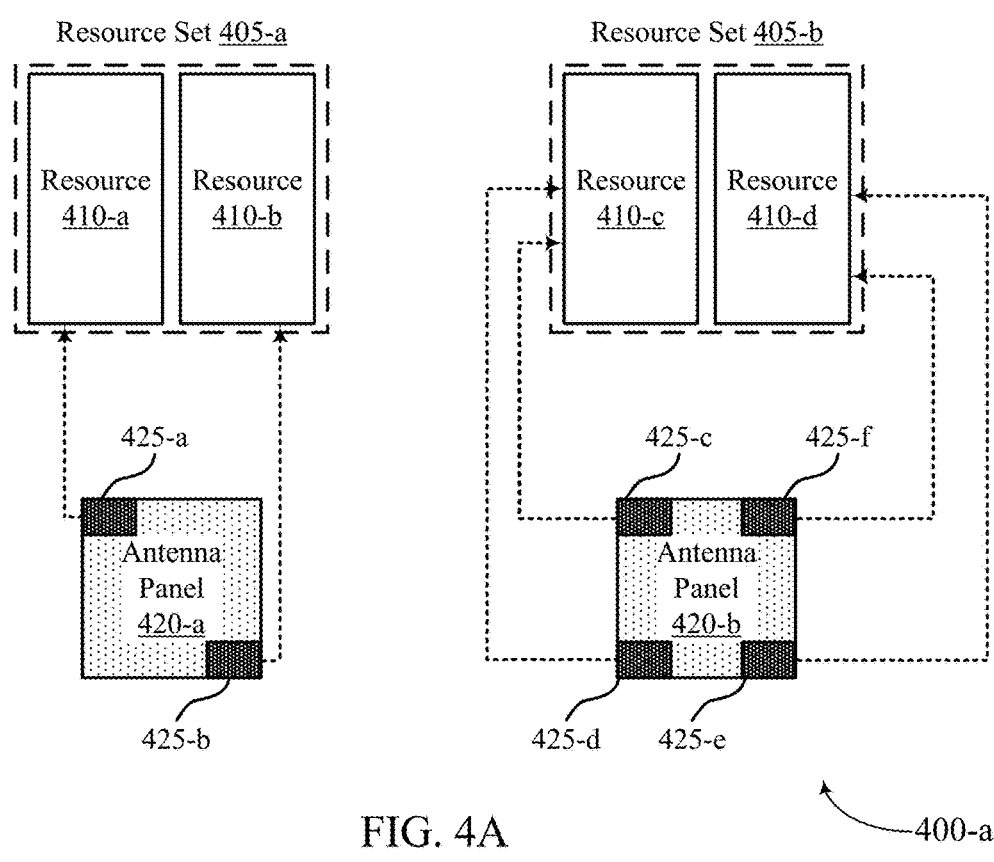
FIGS. 4A and 4B illustrates an example of a resource mappings that supports antenna switching for reference signals in accordance with aspects of the present disclosure.
Figure 4B:
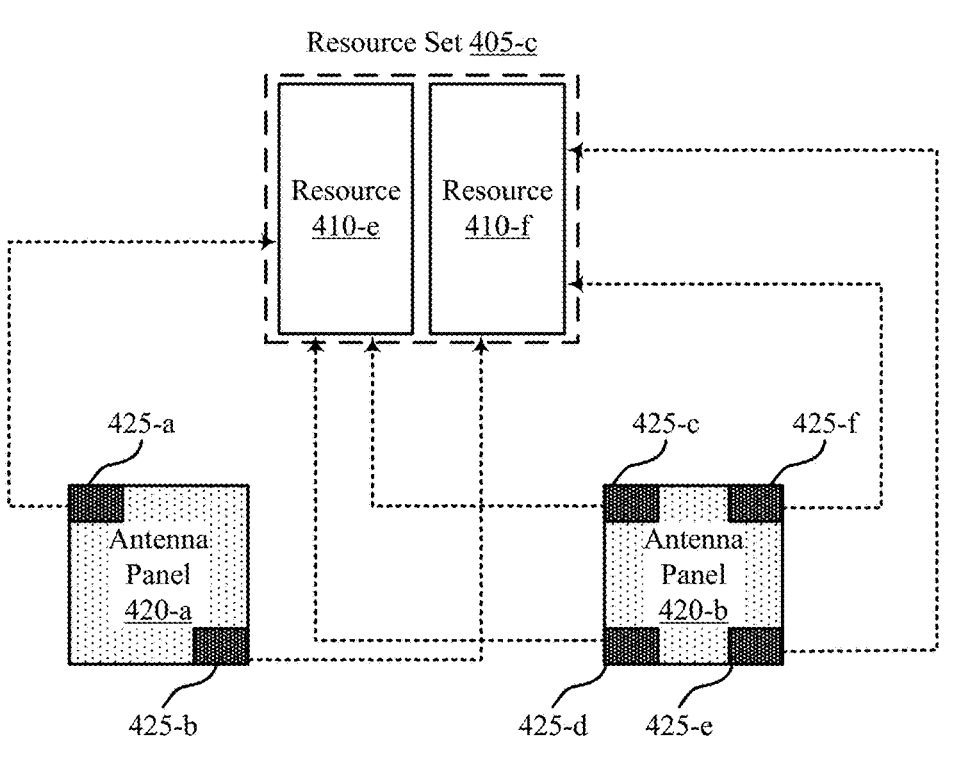

FIGS. 4A & 4B illustrate examples of resource mappings 400 that support antenna switching for reference signals in accordance with aspects of the present disclosure. In some examples, the resource mappings 400 may be implemented by or implement aspects of wireless communications systems 100, 200, or 300. For example, the resource mappings 400 may illustrate configurations for antenna panels 420 at one or more UEs, which may be examples of corresponding devices described with reference to FIGS. 1 through 3.

Each antenna panel 420 may include a quantity of transmit antennas and a quantity of receive antennas 425. According to the techniques described herein, a UE may be configured to indicate to a base station a distribution of transmit antennas and receive antennas 425 across the antenna panels

420 at the UE. In some examples, the UE may be configured to indicate a respective quantity of transmit antennas and receive antennas 425 at each antenna panel 420, such as in a vector with an element for each antenna panel 420. In an illustrative example, the UE may indicate respective quantities of transmit antennas and receive antennas 425 at each of antenna panels 420-*a* and 420-*b* in the vector (1T2R, 2T4R). In some examples, the UE may be configured to indicate a sum of transmit antennas and receive antennas 425 across all antenna panels 420, along with information on how the transmit antennas and receive antennas 425 are distributed. In an illustrative example, the UE may indicate the sums of transmit antennas and receive antennas 425 as 3T6R, along with the distribution information. Based on the indication from the UE, the base station may configure resource sets 405 (e.g., SRS resource sets) for transmitting reference signals on a set of ports in resources 410 of the resource sets 405.

FIG. 4A illustrates a resource mapping 400-*a*, where the base station may configure respective resource sets 405-*a* and 405-*b* corresponding to the respective reported $x_i Ty_i R$ for each of antenna panels 420-*a* and 420-*b*. Within each resource set 405, the base station may configure $y_i/x_i$ resources 410, where each resource 410 may include $x_i$ ports, such that the base station may sound each of the $y_i$ receive antennas 425 of the antenna panel 420 based on receiving reference signals in the resource set 405. For example, in the resource mapping 400-*a*, the UE may report 1T2R for the antenna panel 420-*a* and 2T4R for the antenna panel 420-*b*. Based on the indication, the base station may configure one port in each of resources 410-*a* and 410-*b* in a resource set 405-*a* to sound each of the receive antennas 425-*a* and 425-*b* at the antenna panel 420-*a*. The base station may further configure two ports in each of resources 410-*c* and 410-*d* in a resource set 405-*b* to sound each of receive antennas 425-*c* through 425-*f*.

In some examples, the base station may configure respective sets of power control parameters for each antenna panel 420. For example, the base station may configure a first set of power control parameters for sounding the antennal panel 420-*a* in the resource set 405-*a* and a second set of power control parameters for sounding the antenna panel 420-*b* in the resource set 405-*b*. The base station may configure a total of $$\sum_{i=1}^{N} y_i/x_i$$

resources 410 (e.g., four resources 410, including the resources 410-*a* through 410-*d*) for sounding the $$\sum_{i=1}^{N} y_i$$

receive antennas 425 at N antenna panels 420. Each resource 410 may include a different quantity of ports. For example, the resources 410-*a* and 410-*b* may each include one port, and the resources 410-*c* and 410-*d* may each include two ports.

FIG. 4B illustrates a resource mapping 400-*b*, where the base station may configure resources 410-*e* and 410-*f* that each include a same quantity of ports, where the resources 410-*e* and 410-*f* may be included in a resource set 405-*c*. Each resource 410 may include $$\sum_{i=1}^{N} x_i$$

ports, where N represents the quantity of antenna panels 420 and $x_i$ represents the quantity of transmit antennas at an ith antenna panel 420. In the resource mapping 400-*b*, each of resources 410-*e* and 410-*f* may include three ports.

The base station may configure a total of $$\sum_{i=1}^{N} y_i / \sum_{i=1}^{N} x_i$$

resources 410 (e.g., two resources 410, including the resources 410-*e* and 410-*f*) for sounding the $$\sum_{i=1}^{N} y_i$$

receive antennas 425 at the N antenna panels 420. For each resource 410, the base station may configure different ports with different sets of power control parameters and spatial relation parameters. For example, a first port of each resource 410 (which may correspond to the antenna panel 420-*a*) may be configured with a first set of power control parameters and a first set of spatial relation parameters for transmitting reference signals using a first set of uplink beams. A second two ports of each resource 410 (which may correspond to the antenna panel 420-*b*) may be configured with a second set of power control parameters and a second set of spatial relation parameters for transmitting reference signals using a second set of uplink beams.

Figure 5:
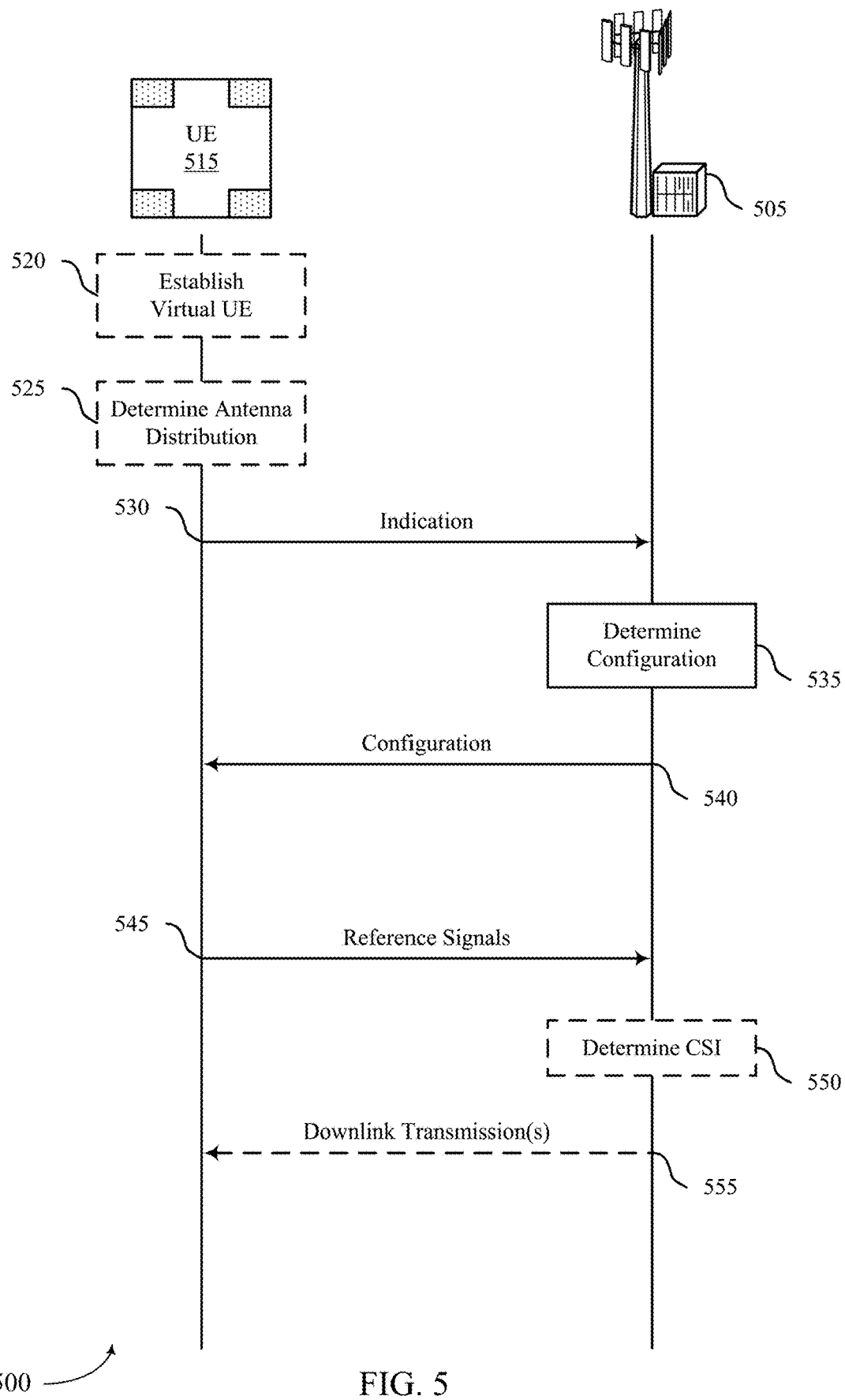
FIG. 5 illustrates an example of a process flow that supports antenna switching for reference signals in accordance with aspects of the present disclosure.

FIG. 5 illustrates an example of a process flow 500 that supports antenna switching for reference signals in accordance with aspects of the present disclosure. In some examples, the process flow 500 may be implemented by or implement aspects of wireless communications systems 100, 200, or 300. For example, the process flow 500 may include example operations associated with one or more of a base station 505 or a UE 515, which may be examples of the corresponding devices described with reference to FIGS. 1 through 3. In the following description of the process flow 500, the operations between the base station 505 and the UE 515 may be performed in a different order than the example order shown, or the operations performed by the base station 505 and the UE 515 may be performed in different orders or at different times. Some operations may also be omitted from the process flow 500, and other operations may be added to the process flow 500. The operations performed by the base station 505 and the UE 515 may support improvement to the UE 515 transmission operations and, in some examples, may promote improvements to efficiency and reliability for communications between the base station 505 and the UE 515, among other benefits.

In some examples, at 520 the UE 515 may establish a relay using sidelink connections with one or more additional UEs (not shown) to create a virtual UE, which in some cases may be referred to as a cooperative UE, to improve a user experience in communications with the base station 505. For example, the UE 515 may include one or more antenna panels, and the additional UEs may include additional antenna panels. The virtual UE may accordingly include a greater quantity of antenna panels (e.g., in a virtual MIMO configuration), which may improve communications reliability and efficiency at the UE 515.

In some examples, at 525 the UE 515 may determine a distribution of transmit antennas and receive antennas over the antenna panels associated with the UE 515. At 530, the UE 515 may transmit an indication of the distribution to the base station 505. In some examples, the UE 515 may be configured to indicate a respective quantity of transmit antennas and receive antennas at each antenna panel, such as in a vector with an element for each antenna panel. In some examples, the UE 515 may be configured to indicate a sum of transmit antennas and receive antennas across all antenna panels, along with information on how the transmit antennas and receive antennas are distributed.

At 535, the base station 505 may determine a configuration for resource sets (e.g., SRS resource sets). In a first option, the base station 505 may configure respective resource sets corresponding to the respective reported $x_i Ty_i R$ for each antenna panel. Within each resource set, the base station 505 may configure $y_i/x_i$ resources, where each resource may include $x_i$ ports. In some examples of the first option, the base station 505 may configure multiple resource sets for a single antenna panel. In some examples of the first option, the base station 505 may configure respective sets of power control parameters for each antenna panel associated with the UE 515. If the base station 505 configures multiple resource sets for an antenna panel, the base station 505 may configure the same set of power control parameters for each resource set for the antenna panel. In the first option, the base station 505 may configure a total of $$\sum_{i=1}^{N} y_i / x_i$$

resources, where N represents the quantity of antenna panels associated with the UE 515. Each resource may include a different quantity of ports. For example, a first $y_1/x_1$ resources may include $x_1$ ports, while a second $y_2/x_2$ resources may include $x_2$ ports.

In a second option, the base station 505 may configure resources such that each resource includes a same quantity of ports, where the resources may be included within one or more resource sets. Each resource may include $$\sum_{i=1}^{N} x_i$$

ports, where N represents the quantity of antenna panels associated with the UE 515 and $x_i$ represents the quantity of transmit antennas at an ith antenna panel. The base station 505 may configure a total of $$\sum_{i=1}^{N} y_i / \sum_{i=1}^{N} x_i$$

resources. For each resource, the base station 505 may configure different ports with different sets of power control parameters and spatial relation parameters. For example, a first $x_1$ ports of each resource (which may correspond to the $x_1$ transmit antennas of a first antenna panel associated with the UE 515) may be configured with a first set of power control parameters and a first set of spatial relation parameters for transmitting reference signals using a first set of uplink beams. A second $x_2$ ports of each resource (which may correspond to the $x_2$ transmit antennas of a second antenna panel associated with the UE 515) may be configured with a second set of power control parameters and a second set of spatial relation parameters for transmitting reference signals using a second set of uplink beams.

At 540, the base station 505 may transmit the configuration to the UE 515. The UE 515 may identify the resource sets configured by the base station 505, for example using the first option or the second option. In some examples, the UE 515 may determine the power control parameters and spatial relation parameters for transmitting reference signals in resources of the resource sets based on receiving the configuration.

At 545, the UE 515 may transmit reference signals (e.g., SRS) to the base station 505 in resource sets according to the configuration. Based on receiving the reference signals, the base station 505 may sound the transmit antennas and receive antennas at each antenna panel associated with the UE 515. In some examples, at 550 the base station may determine CSI for a downlink channel based on assuming a reciprocity between the downlink channel and an uplink channel carrying the reference signals, for example in a TDD configuration. In some examples, at 555 the base station 505 may transmit one or more downlink transmissions to the UE 515 on the downlink channel based on determining the CSI. The operations performed by the base station 505 and the UE 515 may support improvements to the base station 505 reference signal sounding operations and, in some examples, may promote improvements to efficiency and reliability for communications between the base station 505 and the UE 515, among other benefits.

Figure 6:
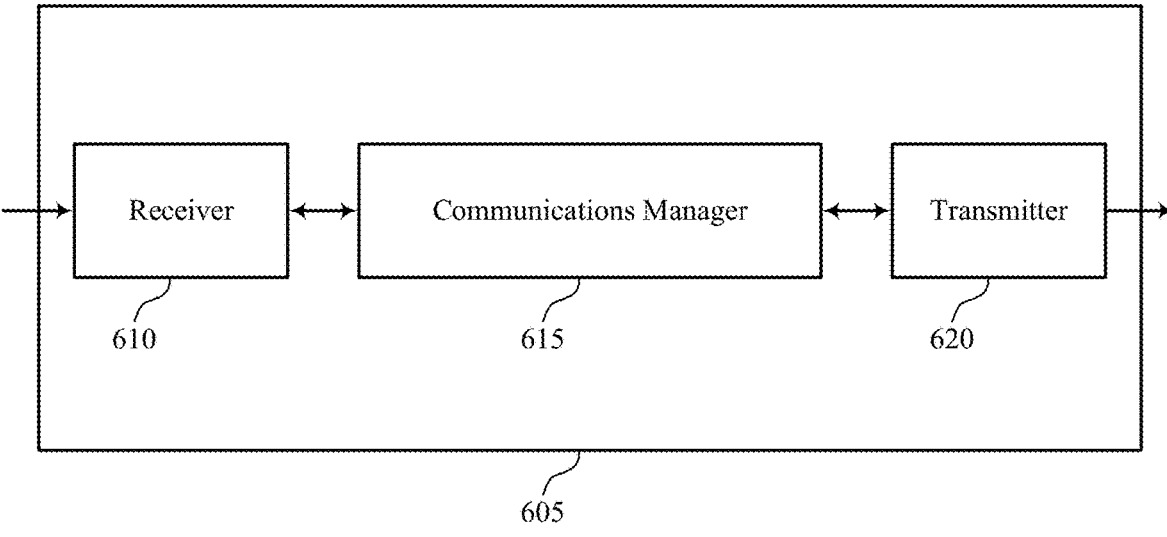
FIGS. 6 and 7 show block diagrams of devices that support antenna switching for reference signals in accordance with aspects of the present disclosure.

FIG. 6 shows a block diagram 600 of a device 605 that supports antenna switching for reference signals in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to antenna switching for reference signals, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may transmit, to a base station, an indication of a distribution of transmit antennas and receive antennas over a set of antenna panels associated with the UE, receive a configuration for a set of resource sets, the configuration mapping a set of ports associated with the set of antenna panels to the set of resource sets, and transmit, using the set of antenna panels, a set of reference signals over the set of resource sets based on the configuration and the distribution of the transmit antennas and the receive antennas over the set of antenna panels.

The communications manager 615 as described herein may be implemented to realize one or more potential advantages. One implementation may allow the device 605 to save power and increase battery life by communicating with a base station 105 (as shown in FIG. 1) more efficiently. For example, the device 605 may efficiently communicate with the base station 105 based on indicating its antenna panel distribution. In some examples, these techniques may improve reliability for downlink transmissions from the base station 105. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
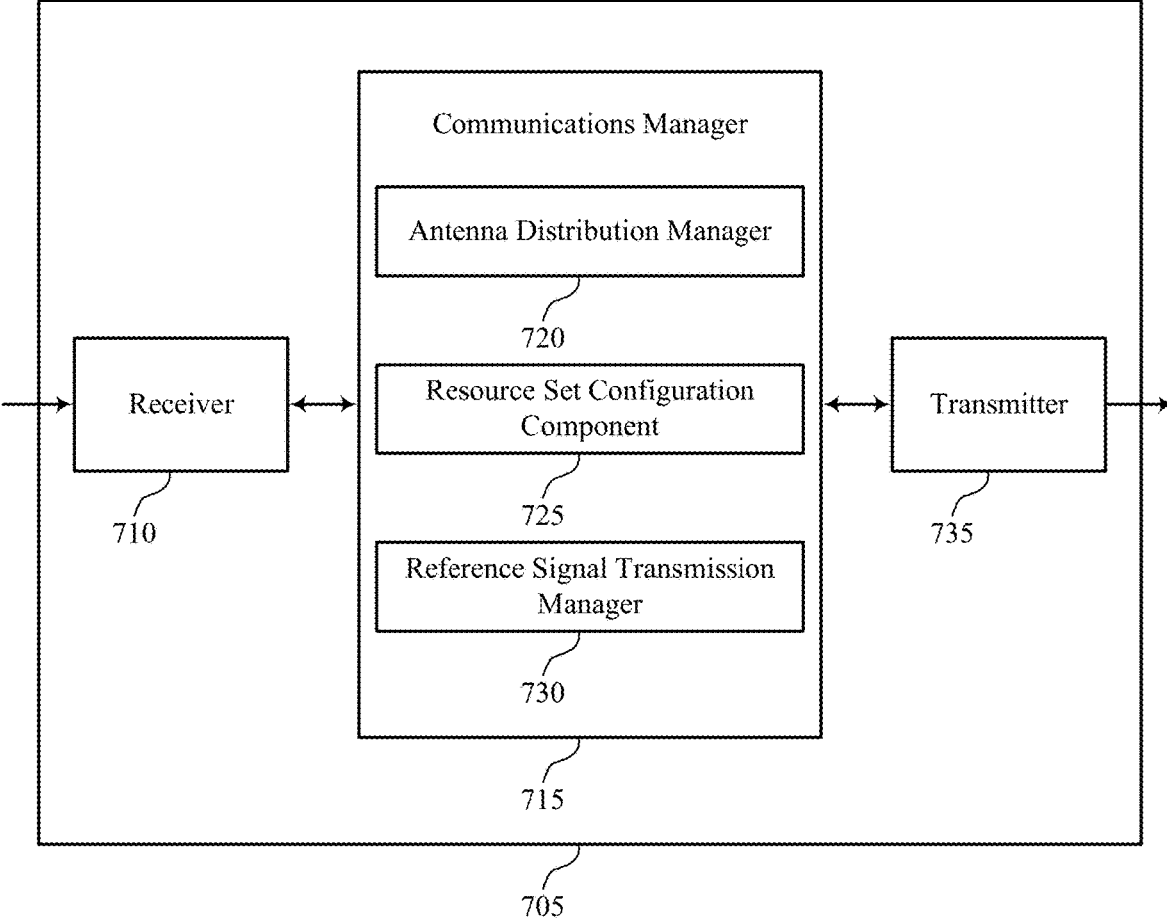

FIG. 7 shows a block diagram 700 of a device 705 that supports antenna switching for reference signals in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to antenna switching for reference signals, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an antenna distribution manager 720, a resource set configuration component 725, and a reference signal transmission manager 730. The communications manager 715 may be an example of aspects of the communications manager 910 described herein.

The antenna distribution manager 720 may transmit, to a base station, an indication of a distribution of transmit antennas and receive antennas over a set of antenna panels associated with the UE. The resource set configuration component 725 may receive a configuration for a set of resource sets, the configuration mapping a set of ports associated with the set of antenna panels to the set of resource sets. The reference signal transmission manager 730 may transmit, using the set of antenna panels, a set of reference signals over the set of resource sets based on the configuration and the distribution of the transmit antennas and the receive antennas over the set of antenna panels.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
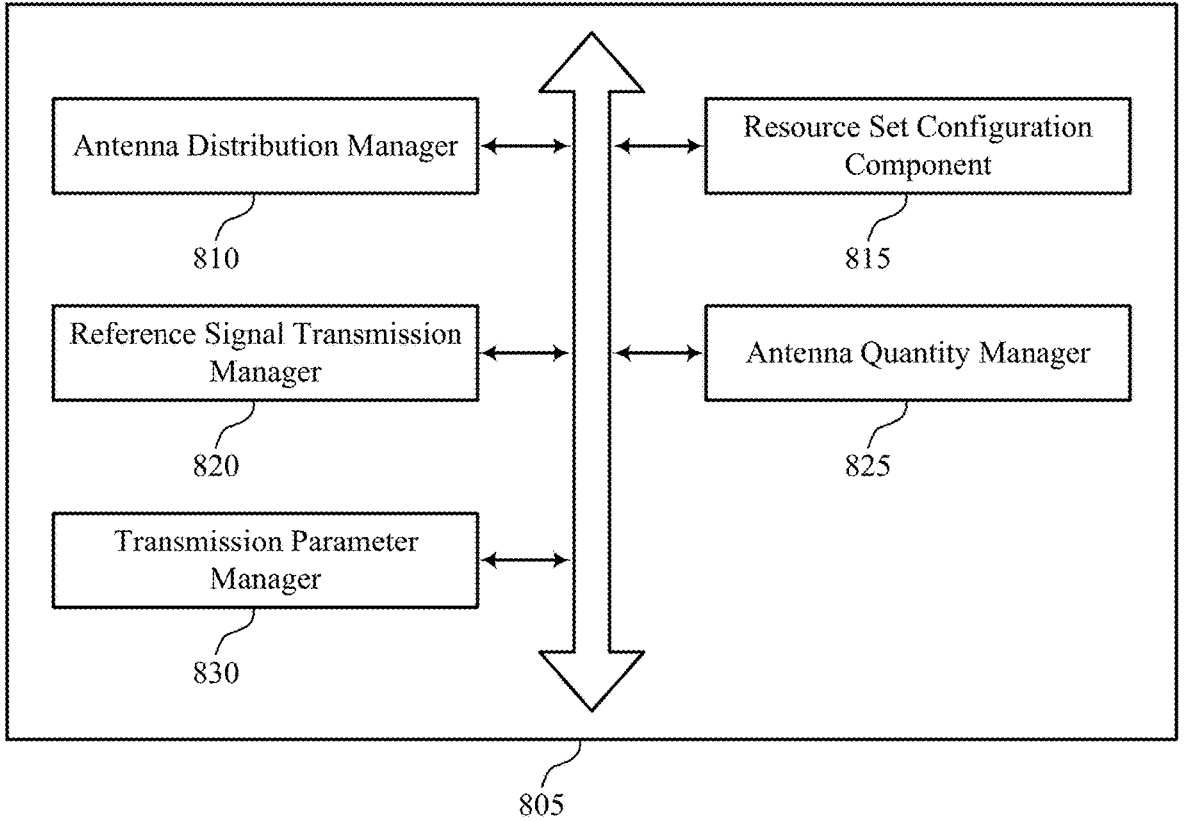
FIG. 8 shows a block diagram of a communications manager that supports antenna switching for reference signals in accordance with aspects of the present disclosure.

FIG. 8 shows a block diagram 800 of a communications manager 805 that supports antenna switching for reference signals in accordance with aspects of the present disclosure. The communications manager 805 may be an example of aspects of a communications manager 615, a communications manager 715, or a communications manager 910 described herein. The communications manager 805 may include an antenna distribution manager 810, a resource set configuration component 815, a reference signal transmission manager 820, an antenna quantity manager 825, and a transmission parameter manager 830. Each of these modules may communicate, directly or indirectly, with one another (e.g., via one or more buses).

The antenna distribution manager 810 may transmit, to a base station, an indication of a distribution of transmit antennas and receive antennas over a set of antenna panels associated with the UE. In some examples, the antenna distribution manager 810 may establish a communication link with one or more UEs, where the set of antenna panels associated with the UE include a respective set of antenna panels associated with each UE of the one or more UEs.

The resource set configuration component 815 may receive a configuration for a set of resource sets, the configuration mapping a set of ports associated with the set of antenna panels to the set of resource sets. In some examples, the resource set configuration component 815 may identify, in the configuration, one or more respective resource sets for each antenna panel of the set of antenna panels based on reporting the respective quantities in the indication. In some cases, a quantity of resources in the one or more respective resource sets for an antenna panel is based on a respective quantity of transmit antennas and receive antennas at the antenna panel. In some cases, the configuration maps the set of ports to the set of resource sets based on the respective sums reported in the indication.

The reference signal transmission manager 820 may transmit, using the set of antenna panels, a set of reference signals over the set of resource sets based on the configuration and the distribution of the transmit antennas and the receive antennas over the set of antenna panels. In some examples, the reference signal transmission manager 820 may transmit respective reference signals over the one or more respective resource sets using respective ports at each antenna panel of the set of antenna panels based on identifying the respective resource set. In some examples, the reference signal transmission manager 820 may transmit respective reference signals over each resource of the set of resource sets based on determining the respective sums of the transmit antennas and the receive antennas. In some cases, the set of reference signals include a set of sounding reference signals.

The antenna quantity manager 825 may determine respective quantities of transmit antennas and receive antennas at each antenna panel of the set of antenna panels, where transmitting to the base station the indication of the distribution of transmit antennas and receive antennas includes reporting the respective quantities in the indication. In some examples, the antenna quantity manager 825 may report a vector corresponding to the set of antenna panels, where the vector includes a set of elements, each element corresponding to respective quantities of transmit antennas and receive antennas at a respective antenna panel of the set of antenna panels. In some examples, the antenna quantity manager 825 may determine respective sums of the transmit antennas and the receive antennas over the set of antenna panels, where transmitting to the base station the indication of the distribution of transmit antennas and receive antennas includes reporting the respective sums in the indication.

The transmission parameter manager 830 may determine respective power control parameters and respective spatial relation parameters corresponding to each antenna panel of the set of antenna panels based on receiving the configuration, where the set of reference signals are transmitted over the set of resource sets based on the respective power control parameters and the respective spatial relation parameters. In some examples, the transmission parameter manager 830 may determine respective sets of power control parameters and respective sets of spatial relation parameters corresponding to each resource of the set of resource sets based on receiving the configuration, where the set of reference signals are transmitted over the set of resource sets based on the respective sets of power control parameters and the respective sets of spatial relation parameters.

Figure 9:
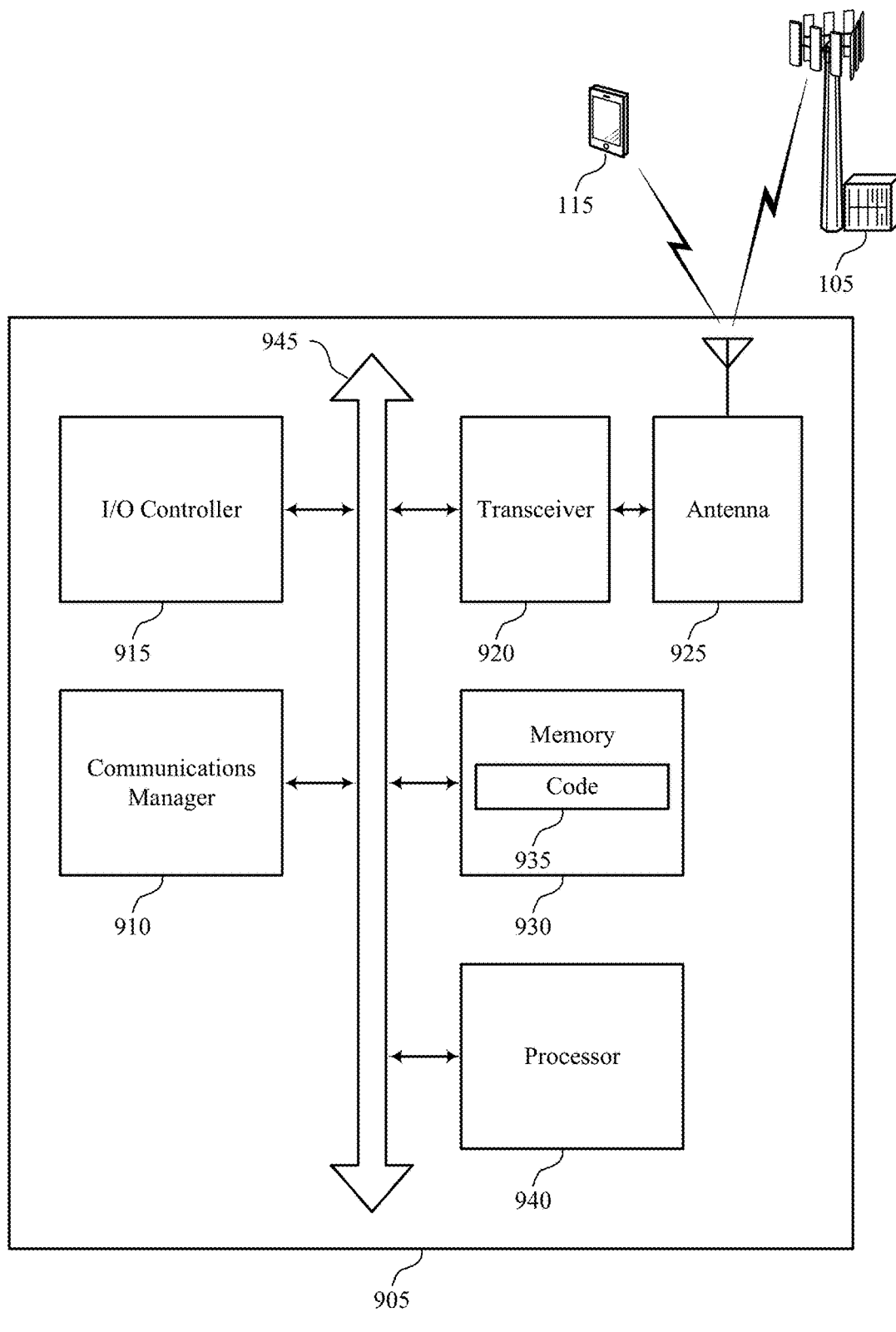
FIG. 9 shows a diagram of a system including a device that supports antenna switching for reference signals in accordance with aspects of the present disclosure.

FIG. 9 shows a diagram of a system 900 including a device 905 that supports antenna switching for reference signals in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may transmit, to a base station, an indication of a distribution of transmit antennas and receive antennas over a set of antenna panels associated with the UE, receive a configuration for a set of resource sets, the configuration mapping a set of ports associated with the set of antenna panels to the set of resource sets, and transmit, using the set of antenna panels, a set of reference signals over the set of resource sets based on the configuration and the distribution of the transmit antennas and the receive antennas over the set of antenna panels.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touch-screen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting antenna switching for reference signals).

The processor 940 of the device 905 (e.g., controlling the receiver 610, the transmitter 620, or the transceiver 920) may reduce power consumption and increase communications efficiency based on indicating the antenna panel distribution. In some examples, the processor 940 of the device 905 may reconfigure parameters for reference signal transmissions according to the received configuration. For example, the processor 940 of the device 905 may turn on one or more processing units for configuring reference signal transmissions, increase a processing clock, or a similar mechanism within the device 905. As such, when subsequent resource set configurations are received, the processor 940 may be ready to respond more efficiently through the reduction of a ramp up in processing power.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
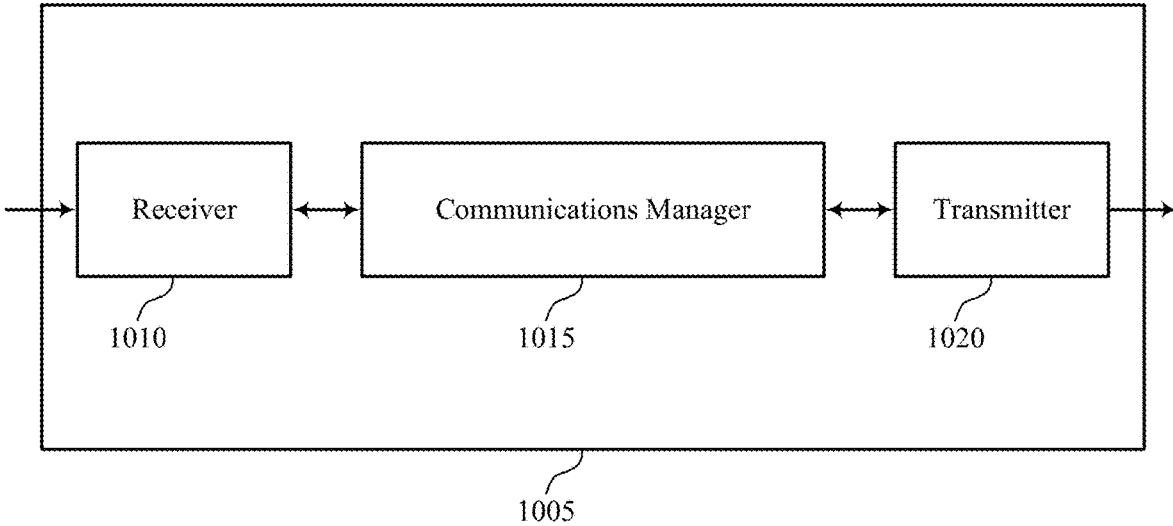
FIGS. 10 and 11 show block diagrams of devices that support antenna switching for reference signals in accordance with aspects of the present disclosure.

FIG. 10 shows a block diagram 1000 of a device 1005 that supports antenna switching for reference signals in accordance with aspects of the present disclosure. The device 1005 may be an example of aspects of a base station 105 as described herein. The device 1005 may include a receiver 1010, a communications manager 1015, and a transmitter

1020. The device 1005 may also include a processor. Each of these components may be in communication with one another (e.g., via one or more buses).

The receiver 1010 may receive information such as packets, user data, or control information associated with various information channels (e.g., control channels, data channels, and information related to antenna switching for reference signals, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive, from a UE, an indication of a distribution of transmit antennas and receive antennas over a set of antenna panels associated with the UE, determine a configuration for a set of resource sets, the configuration mapping a set of ports associated with the set of antenna panels to the set of resource sets, transmit the configuration to the UE, and receive a set of reference signals over the set of resource sets based on transmitting the configuration and the distribution of the transmit antennas and the receive antennas over the set of antenna panels associated with the UE.

The communications manager 1015 as described herein may be implemented to realize one or more potential advantages. One implementation may allow the device 1005 to save power by communicating with a UE 115 (as shown in FIG. 1) more efficiently. For example, the device 1005 may improve reliability in communications with a UE 115, as the device 1005 may be able to configure resource sets for reference signal transmissions at the UE 115. In some examples, these techniques may improve reliability for downlink transmissions from the device 1005. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
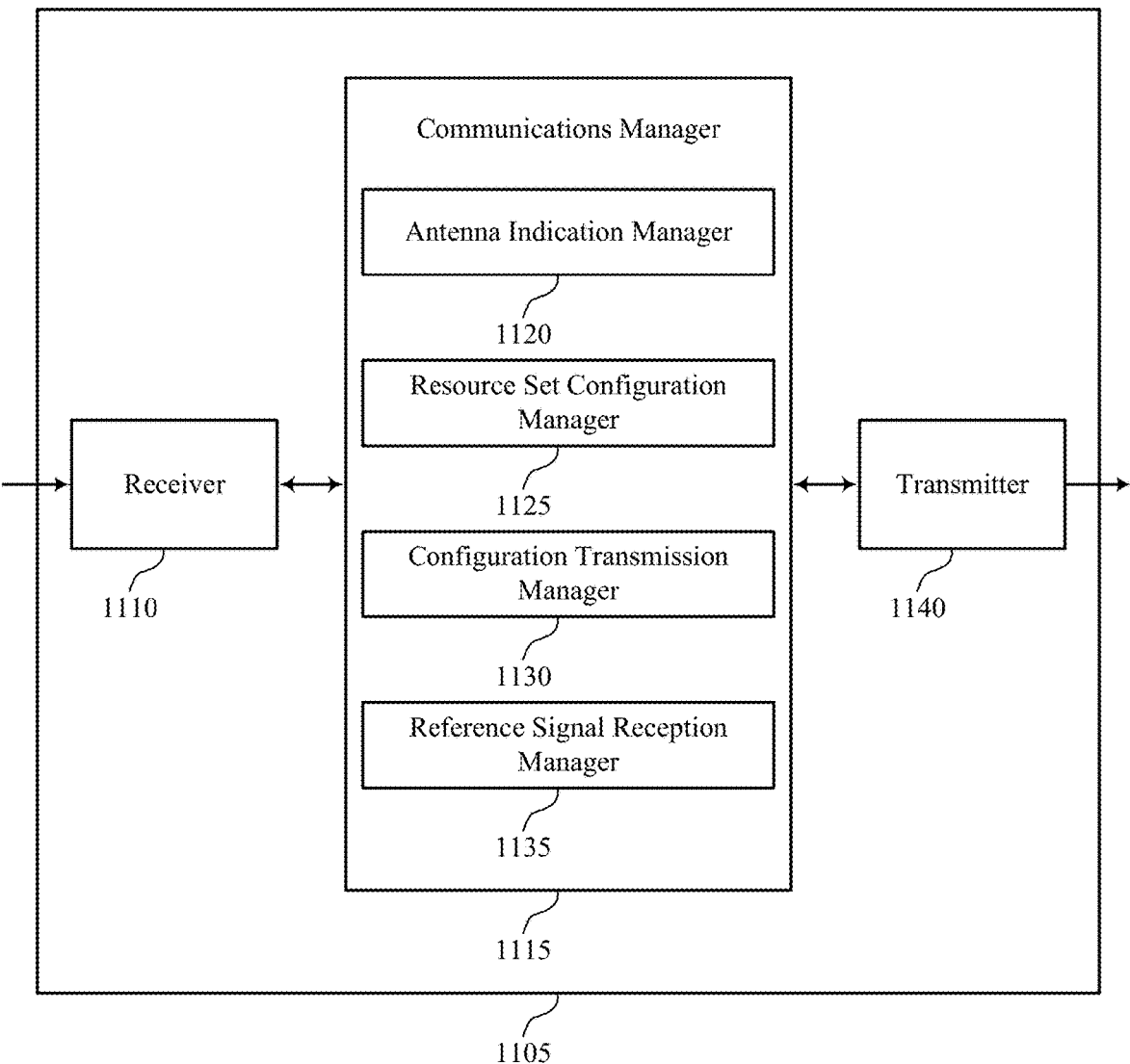

FIG. 11 shows a block diagram 1100 of a device 1105 that supports antenna switching for reference signals in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to antenna switching for reference signals, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an antenna indication manager 1120, a resource set configuration manager 1125, a configuration transmission manager 1130, and a reference signal reception manager 1135. The communications manager 1115 may be an example of aspects of the communications manager 1310 described herein.

The antenna indication manager 1120 may receive, from a UE, an indication of a distribution of transmit antennas and receive antennas over a set of antenna panels associated with the UE. The resource set configuration manager 1125 may determine a configuration for a set of resource sets, the configuration mapping a set of ports associated with the set of antenna panels to the set of resource sets. The configuration transmission manager 1130 may transmit the configuration to the UE. The reference signal reception manager 1135 may receive a set of reference signals over the set of resource sets based on transmitting the configuration and the distribution of the transmit antennas and the receive antennas over the set of antenna panels associated with the UE.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
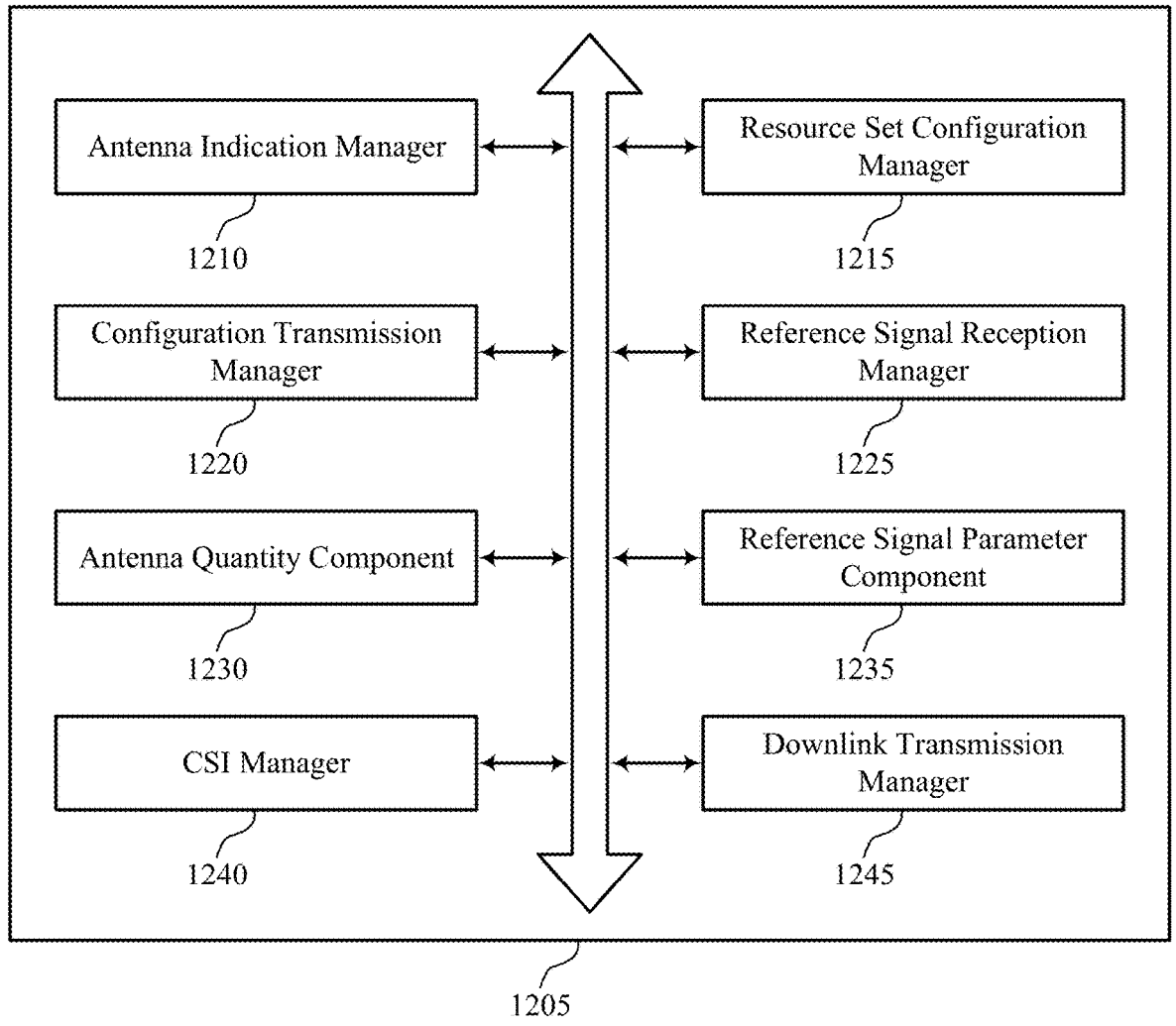
FIG. 12 shows a block diagram of a communications manager that supports antenna switching for reference signals in accordance with aspects of the present disclosure.

FIG. 12 shows a block diagram 1200 of a communications manager 1205 that supports antenna switching for reference signals in accordance with aspects of the present disclosure. The communications manager 1205 may be an example of aspects of a communications manager 1015, a communications manager 1115, or a communications manager 1310 described herein. The communications manager 1205 may include an antenna indication manager 1210, a resource set configuration manager 1215, a configuration transmission manager 1220, a reference signal reception manager 1225, an antenna quantity component 1230, a reference signal parameter component 1235, a CSI manager 1240, and a downlink transmission manager 1245. Each of these modules may communicate, directly or indirectly, with one another (e.g., via one or more buses).

The antenna indication manager 1210 may receive, from a UE, an indication of a distribution of transmit antennas and receive antennas over a set of antenna panels associated with the UE.

The resource set configuration manager 1215 may determine a configuration for a set of resource sets, the configuration mapping a set of ports associated with the set of antenna panels to the set of resource sets. In some examples, the resource set configuration manager 1215 may determine one or more respective resource sets for each antenna panel of the set of antenna panels based on determining the respective quantities, where determining the configuration is based on determining the one or more respective resource sets. In some cases, each resource of the one or more respective resource sets for an antenna panel corresponds to a respective quantity of transmit antennas and receive antennas at the antenna panel. In some cases, the configuration maps the set of ports to the set of resource sets based on determining the respective sums.

The configuration transmission manager 1220 may transmit the configuration to the UE.

The reference signal reception manager 1225 may receive a set of reference signals over the set of resource sets based on transmitting the configuration and the distribution of the transmit antennas and the receive antennas over the set of antenna panels associated with the UE. In some examples, the reference signal reception manager 1225 may receive respective reference signals over the one or more respective resource sets based on transmitting the configuration to the UE. In some examples, the reference signal reception manager 1225 may receive respective reference signals over each resource of the set of resource sets based on determining the respective sums of the transmit antennas and the receive antennas. In some cases, the set of reference signals include a set of sounding reference signals.

The antenna quantity component 1230 may determine respective quantities of transmit antennas and receive antennas at each antenna panel of the set of antenna panels based on receiving the indication. In some examples, the antenna quantity component 1230 may receive, in the indication, a vector corresponding to the set of antenna panels, where the vector includes a set of elements, each element corresponding to respective quantities of transmit antennas and receive antennas at a respective antenna panel of the set of antenna panels. In some examples, the antenna quantity component 1230 may determine respective sums of the transmit antennas and the receive antennas over the set of antenna panels based on receiving the indication.

The reference signal parameter component 1235 may determine respective power control parameters and respective spatial relation parameters corresponding to each antenna panel of the set of antenna panels, where the configuration transmitted to the UE includes the respective power control parameters and the respective spatial relation parameters, and where the set of reference signals are received over the set of resource sets based on the respective power control parameters and the respective spatial relation parameters. In some examples, the reference signal parameter component 1235 may determine respective sets of power control parameters and respective sets of spatial relation parameters corresponding to each resource of the set of resource sets, where determining the configuration is based on determining the respective sets of power control parameters and respective sets of spatial relation parameters, and where the set of reference signals are received over the set of resource sets based on the respective sets of power control parameters and the respective sets of spatial relation parameters.

The CSI manager 1240 may determine channel state information for one or more downlink transmissions to the UE based on receiving the set of reference signals.

The downlink transmission manager 1245 may transmit the one or more downlink transmissions based on determining the channel state information.

Figure 13:
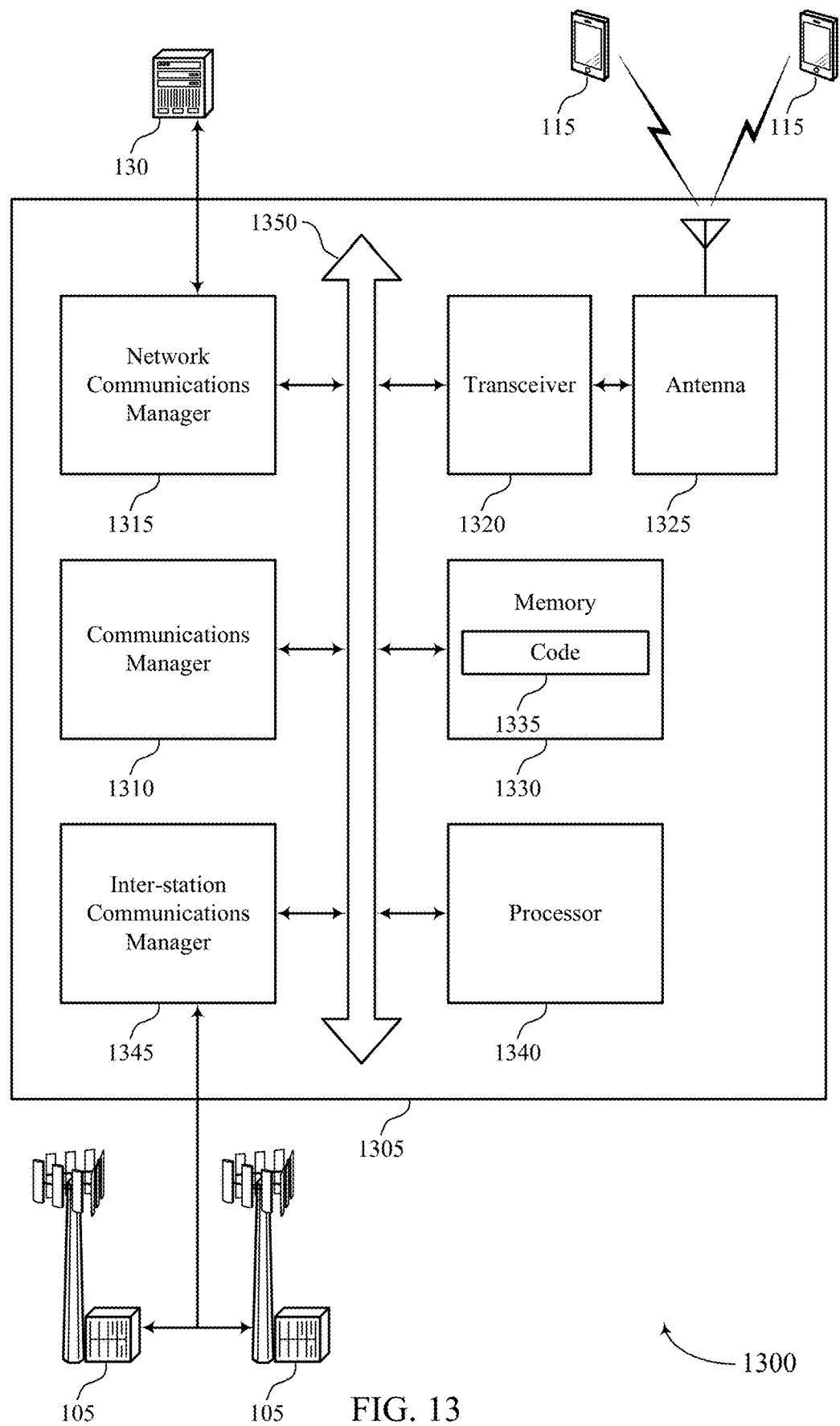
FIG. 13 shows a diagram of a system including a device that supports antenna switching for reference signals in accordance with aspects of the present disclosure.

FIG. 13 shows a diagram of a system 1300 including a device 1305 that supports antenna switching for reference signals in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may receive, from a UE, an indication of a distribution of transmit antennas and receive antennas over a set of antenna panels associated with the UE, determine a configuration for a set of resource sets, the configuration mapping a set of ports associated with the set of antenna panels to the set of resource sets, transmit the configuration to the UE, and receive a set of reference signals over the set of resource sets based on transmitting the configuration and the distribution of the transmit antennas and the receive antennas over the set of antenna panels associated with the UE.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting antenna switching for reference signals).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

FIG. 14 shows a flowchart illustrating a method 1400 that supports antenna switching for reference signals in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may transmit, to a base station, an indication of a distribution of transmit antennas and receive antennas over a set of antenna panels associated with the UE. The operations of 1405 may be performed according to the methods described herein. In some examples, aspects of the operations of 1405 may be performed by an antenna distribution manager as described with reference to FIGS. 6 through 9.

At 1410, the UE may receive a configuration for a set of resource sets, the configuration mapping a set of ports associated with the set of antenna panels to the set of resource sets. The operations of 1410 may be performed according to the methods described herein. In some examples, aspects of the operations of 1410 may be performed by a resource set configuration component as described with reference to FIGS. 6 through 9.

At 1415, the UE may transmit, using the set of antenna panels, a set of reference signals over the set of resource sets based on the configuration and the distribution of the transmit antennas and the receive antennas over the set of antenna panels. The operations of 1415 may be performed according to the methods described herein. In some examples, aspects of the operations of 1415 may be performed by a reference signal transmission manager as described with reference to FIGS. 6 through 9.

FIG. 15 shows a flowchart illustrating a method 1500 that supports antenna switching for reference signals in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may determine respective quantities of transmit antennas and receive antennas at each antenna panel of a set of antenna panels associated with the UE. The operations of 1505 may be performed according to the methods described herein. In some examples, aspects of the operations of 1505 may be performed by an antenna quantity manager as described with reference to FIGS. 6 through 9.

At 1510, the UE may transmit, to a base station, an indication of a distribution of transmit antennas and receive antennas over the set of antenna panels, where transmitting the indication includes reporting the respective quantities in the indication. The operations of 1510 may be performed according to the methods described herein. In some examples, aspects of the operations of 1510 may be performed by an antenna distribution manager as described with reference to FIGS. 6 through 9.

At 1515, the UE may receive a configuration for a set of resource sets, the configuration mapping a set of ports associated with the set of antenna panels to the set of resource sets. The operations of 1515 may be performed according to the methods described herein. In some examples, aspects of the operations of 1515 may be performed by a resource set configuration component as described with reference to FIGS. 6 through 9.

At 1520, the UE may transmit, using the set of antenna panels, a set of reference signals over the set of resource sets based on the configuration and the distribution of the transmit antennas and the receive antennas over the set of antenna panels. The operations of 1520 may be performed according to the methods described herein. In some examples, aspects of the operations of 1520 may be performed by a reference signal transmission manager as described with reference to FIGS. 6 through 9.

FIG. 16 shows a flowchart illustrating a method 1600 that supports antenna switching for reference signals in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may determine respective sums of transmit antennas and receive antennas over a set of antenna panels associated with the UE. The operations of 1605 may be performed according to the methods described herein. In some examples, aspects of the operations of 1605 may be performed by an antenna quantity manager as described with reference to FIGS. 6 through 9.

At 1610, the UE may transmit, to a base station, an indication of a distribution of transmit antennas and receive antennas over the set of antenna panels, where transmitting the indication includes reporting the respective sums in the indication. The operations of 1610 may be performed according to the methods described herein. In some examples, aspects of the operations of 1610 may be performed by an antenna distribution manager as described with reference to FIGS. 6 through 9.

At 1615, the UE may receive a configuration for a set of resource sets, the configuration mapping a set of ports associated with the set of antenna panels to the set of resource sets. The operations of 1615 may be performed according to the methods described herein. In some examples, aspects of the operations of 1615 may be performed by a resource set configuration component as described with reference to FIGS. 6 through 9.

At 1620, the UE may transmit, using the set of antenna panels, a set of reference signals over the set of resource sets based on the configuration and the distribution of the transmit antennas and the receive antennas over the set of antenna panels. The operations of 1620 may be performed according to the methods described herein. In some examples, aspects of the operations of 1620 may be performed by a reference signal transmission manager as described with reference to FIGS. 6 through 9.

FIG. 17 shows a flowchart illustrating a method 1700 that supports antenna switching for reference signals in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may receive, from a UE, an indication of a distribution of transmit antennas and receive antennas over a set of antenna panels associated with the UE. The operations of 1705 may be performed according to the methods described herein. In some examples, aspects of the operations of 1705 may be performed by an antenna indication manager as described with reference to FIGS. 10 through 13.

At 1710, the base station may determine a configuration for a set of resource sets, the configuration mapping a set of ports associated with the set of antenna panels to the set of resource sets. The operations of 1710 may be performed according to the methods described herein. In some examples, aspects of the operations of 1710 may be performed by a resource set configuration manager as described with reference to FIGS. 10 through 13.

At 1715, the base station may transmit the configuration to the UE. The operations of 1715 may be performed according to the methods described herein. In some examples, aspects of the operations of 1715 may be performed by a configuration transmission manager as described with reference to FIGS. 10 through 13.

At 1720, the base station may receive a set of reference signals over the set of resource sets based on transmitting the configuration and the distribution of the transmit antennas and the receive antennas over the set of antenna panels associated with the UE. The operations of 1720 may be performed according to the methods described herein. In some examples, aspects of the operations of 1720 may be performed by a reference signal reception manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A network entity, comprising:
   one or more memories storing processor-executable code; and
   one or more processors coupled with the one or more memories and individually or collectively operable to execute the code to cause the network entity to:
      receive, from a user equipment (UE), an indication of a distribution of transmit antennas and receive antennas over a plurality of antenna panels associated with the UE;

transmit, to the UE, a configuration for a plurality of resource sets, the configuration comprising a mapping of a set of ports associated with the plurality of antenna panels to the plurality of resource sets; and receive a set of reference signals over the plurality of resource sets based at least in part on transmitting the configuration and the distribution of the transmit antennas and the receive antennas over the plurality of antenna panels associated with the UE.

2. The network entity of claim 1, wherein the one or more processors are individually or collectively further operable to execute the code to cause the network entity to:

determine respective quantities of transmit antennas and receive antennas at each antenna panel of the plurality of antenna panels based at least in part on receiving the indication.

3. The network entity of claim 2, wherein the one or more processors are individually or collectively further operable to execute the code to cause the network entity to:

receive, in the indication, a vector corresponding to the plurality of antenna panels, wherein the vector comprises a set of elements, each element corresponding to respective quantities of transmit antennas and receive antennas at a respective antenna panel of the plurality of antenna panels.

4. The network entity of claim 2, wherein the one or more processors are individually or collectively further operable to execute the code to cause the network entity to:

determine one or more respective resource sets for each antenna panel of the plurality of antenna panels based at least in part on determining the respective quantities, wherein the configuration is based at least in part on determining the one or more respective resource sets.

5. The network entity of claim 4, wherein the one or more processors are individually or collectively further operable to execute the code to cause the network entity to:

determine respective power control parameters and respective spatial relation parameters corresponding to each antenna panel of the plurality of antenna panels, wherein the configuration transmitted to the UE comprises the respective power control parameters and the respective spatial relation parameters, and wherein the set of reference signals are received over the plurality of resource sets based at least in part on the respective power control parameters and the respective spatial relation parameters.

6. The network entity of claim 4, wherein, to receive the set of reference signals over the plurality of resource sets, the one or more processors are individually or collectively operable to execute the code to cause the network entity to:

receive respective reference signals over the one or more respective resource sets based at least in part on transmitting the configuration to the UE.

7. The network entity of claim 4, wherein each resource of the one or more respective resource sets for an antenna panel corresponds to a respective quantity of transmit antennas and receive antennas at the antenna panel.

8. The network entity of claim 1, wherein the one or more processors are individually or collectively further operable to execute the code to cause the network entity to:

determine respective sums of the transmit antennas and the receive antennas over the plurality of antenna panels based at least in part on receiving the indication.

9. The network entity of claim 8, wherein the one or more processors are individually or collectively further operable to execute the code to cause the network entity to:

determine respective sets of power control parameters and respective sets of spatial relation parameters corresponding to each resource of the plurality of resource sets, wherein the configuration is based at least in part on determining the respective sets of power control parameters and respective sets of spatial relation parameters, and wherein the set of reference signals are received over the plurality of resource sets based at least in part on the respective sets of power control parameters and the respective sets of spatial relation parameters.

10. The network entity of claim 8, wherein, to receive the set of reference signals over the plurality of resource sets, the one or more processors are individually or collectively operable to execute the code to cause the network entity to:

receive respective reference signals over each resource of the plurality of resource sets based at least in part on determining the respective sums of the transmit antennas and the receive antennas.

11. The network entity of claim 8, wherein the mapping of the set of ports to the plurality of resource sets is based at least in part on determining the respective sums.

12. The network entity of claim 1, wherein the one or more processors are individually or collectively further operable to execute the code to cause the network entity to:

determine channel state information for one or more downlink transmissions to the UE based at least in part on receiving the set of reference signals; and transmit the one or more downlink transmissions based at least in part on determining the channel state information.

13. The network entity of claim 1, wherein the set of reference signals comprise a set of sounding reference signals.

14. A method for wireless communications at a network entity, comprising:

receiving, from a user equipment (UE), an indication of a distribution of transmit antennas and receive antennas over a plurality of antenna panels associated with the UE;

transmitting, to the UE, a configuration for a plurality of resource sets, the configuration comprising a mapping of a set of ports associated with the plurality of antenna panels to the plurality of resource sets; and receiving a set of reference signals over the plurality of resource sets based at least in part on transmitting the configuration and the distribution of the transmit antennas and the receive antennas over the plurality of antenna panels associated with the UE.

15. The method of claim 14, further comprising:

determining respective quantities of transmit antennas and receive antennas at each antenna panel of the plurality of antenna panels based at least in part on receiving the indication.

16. The method of claim 15, further comprising:

receiving, in the indication, a vector corresponding to the plurality of antenna panels, wherein the vector comprises a set of elements, each element corresponding to respective quantities of transmit antennas and receive antennas at a respective antenna panel of the plurality of antenna panels.

17. The method of claim 15, further comprising:

determining one or more respective resource sets for each antenna panel of the plurality of antenna panels based at least in part on determining the respective quantities, wherein the configuration is based at least in part on determining the one or more respective resource sets.

18. The method of claim 17, further comprising:
determining respective power control parameters and respective spatial relation parameters corresponding to each antenna panel of the plurality of antenna panels, wherein the configuration transmitted to the UE comprises the respective power control parameters and the respective spatial relation parameters, and wherein the set of reference signals are received over the plurality of resource sets based at least in part on the respective power control parameters and the respective spatial relation parameters.

19. The method of claim 17, wherein receiving the set of reference signals over the plurality of resource sets comprises:
receiving respective reference signals over the one or more respective resource sets based at least in part on transmitting the configuration to the UE.

20. The method of claim 17, wherein each resource of the one or more respective resource sets for an antenna panel corresponds to a respective quantity of transmit antennas and receive antennas at the antenna panel.

21. The method of claim 14, further comprising:
determining respective sums of the transmit antennas and the receive antennas over the plurality of antenna panels based at least in part on receiving the indication.

22. The method of claim 21, further comprising:
determining respective sets of power control parameters and respective sets of spatial relation parameters corresponding to each resource of the plurality of resource sets, wherein the configuration is based at least in part on determining the respective sets of power control parameters and respective sets of spatial relation parameters, and wherein the set of reference signals are received over the plurality of resource sets based at least in part on the respective sets of power control parameters and the respective sets of spatial relation parameters.

23. The method of claim 21, wherein receiving the set of reference signals over the plurality of resource sets comprises:
receiving respective reference signals over each resource of the plurality of resource sets based at least in part on determining the respective sums of the transmit antennas and the receive antennas.

24. The method of claim 21, wherein the mapping of the set of ports to the plurality of resource sets is based at least in part on determining the respective sums.

25. The method of claim 14, further comprising:
determining channel state information for one or more downlink transmissions to the UE based at least in part on receiving the set of reference signals; and transmitting the one or more downlink transmissions based at least in part on determining the channel state information.

26. The method of claim 14, wherein the set of reference signals comprise a set of sounding reference signals.

27. A network entity for wireless communications, comprising:
means for receiving, from a user equipment (UE), an indication of a distribution of transmit antennas and receive antennas over a plurality of antenna panels associated with the UE;
means for transmitting, to the UE, a configuration for a plurality of resource sets, the configuration comprising a mapping of a set of ports associated with the plurality of antenna panels to the plurality of resource sets; and
means for receiving a set of reference signals over the plurality of resource sets based at least in part on transmitting the configuration and the distribution of the transmit antennas and the receive antennas over the plurality of antenna panels associated with the UE.

28. The network entity of claim 27, further comprising:
means for determining respective quantities of transmit antennas and receive antennas at each antenna panel of the plurality of antenna panels based at least in part on receiving the indication.

29. A non-transitory computer-readable medium storing code for wireless communications, the code comprising instructions executable by one or more processors to:
receive, from a user equipment (UE), an indication of a distribution of transmit antennas and receive antennas over a plurality of antenna panels associated with the UE;
transmit, to the UE, a configuration for a plurality of resource sets, the configuration comprising a mapping of a set of ports associated with the plurality of antenna panels to the plurality of resource sets; and
receive a set of reference signals over the plurality of resource sets based at least in part on transmitting the configuration and the distribution of the transmit antennas and the receive antennas over the plurality of antenna panels associated with the UE.

30. The non-transitory computer-readable medium of claim 29, wherein the instructions are further executable by the one or more processors to:
determine respective quantities of transmit antennas and receive antennas at each antenna panel of the plurality of antenna panels based at least in part on receiving the indication.

* * * * *